United States Patent [19]

Amari

[11] 4,007,482
[45] Feb. 8, 1977

[54] MAGNETIC RECORDING AND/OR REPRODUCING APPARATUS

[75] Inventor: Shinji Amari, Tokyo, Japan

[73] Assignee: Sony Corporation, Tokyo, Japan

[22] Filed: Nov. 24, 1975

[21] Appl. No.: 634,668

Related U.S. Application Data

[63] Continuation of Ser. No. 492,330, July 26, 1974, abandoned.

[30] Foreign Application Priority Data

July 31, 1973 Japan .............................. 48-86111
Aug. 18, 1973 Japan .............................. 48-92699

[52] U.S. Cl. .................................................. 358/4
[51] Int. Cl.$^2$ ........................................ H04N 5/79
[58] Field of Search ............ 358/4; 360/33, 34, 18, 360/20, 24, 55, 8, 9

[56] References Cited

UNITED STATES PATENTS 3,812,523   5/1974   Narahara .............................. 358/4

Primary Examiner—John C. Martin
Attorney, Agent, or Firm—Lewis H. Eslinger; Alvin Sinderbrand

[57] ABSTRACT

In recording periodic information signals, such as, the chrominance signal components of video signals, having first or field intervals and second or line intervals which are recorded in respective areas or increments of successive parallel tracks on a record medium with the ends of the margins between the areas in which the second or line intervals are recorded in each of the tracks being aligned in the direction transverse to the lengths of the tracks, with the adjacent ends of such margins in the next adjacent tracks; interference or cross-talk between signals recorded in adjacent tracks is reduced or eliminated during reproduction by recording the information signals with different first and second carriers in the adjacent tracks, respectively. Such first and second carriers for signals recorded in adjacent tracks may be distinguished from each other by their respective frequency and/or polarity characteristics so that, upon reproduction of the signals recorded in a particular track, the cross-talk signals from adjacent tracks can be conveniently suppressed or eliminated, for example, with the aid of a simple comb filter, by reason of the different frequency and/or polarity characteristics of the carriers with which the signals are recorded in that particular track and in the next adjacent tracks, respectively.

55 Claims, 21 Drawing Figures

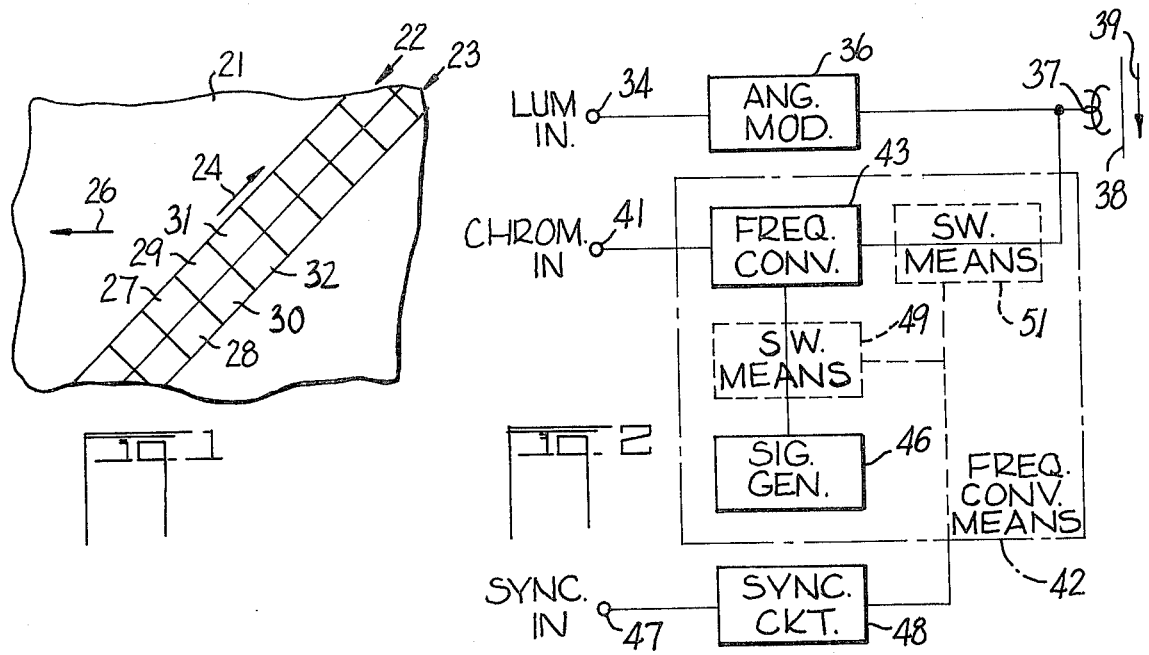
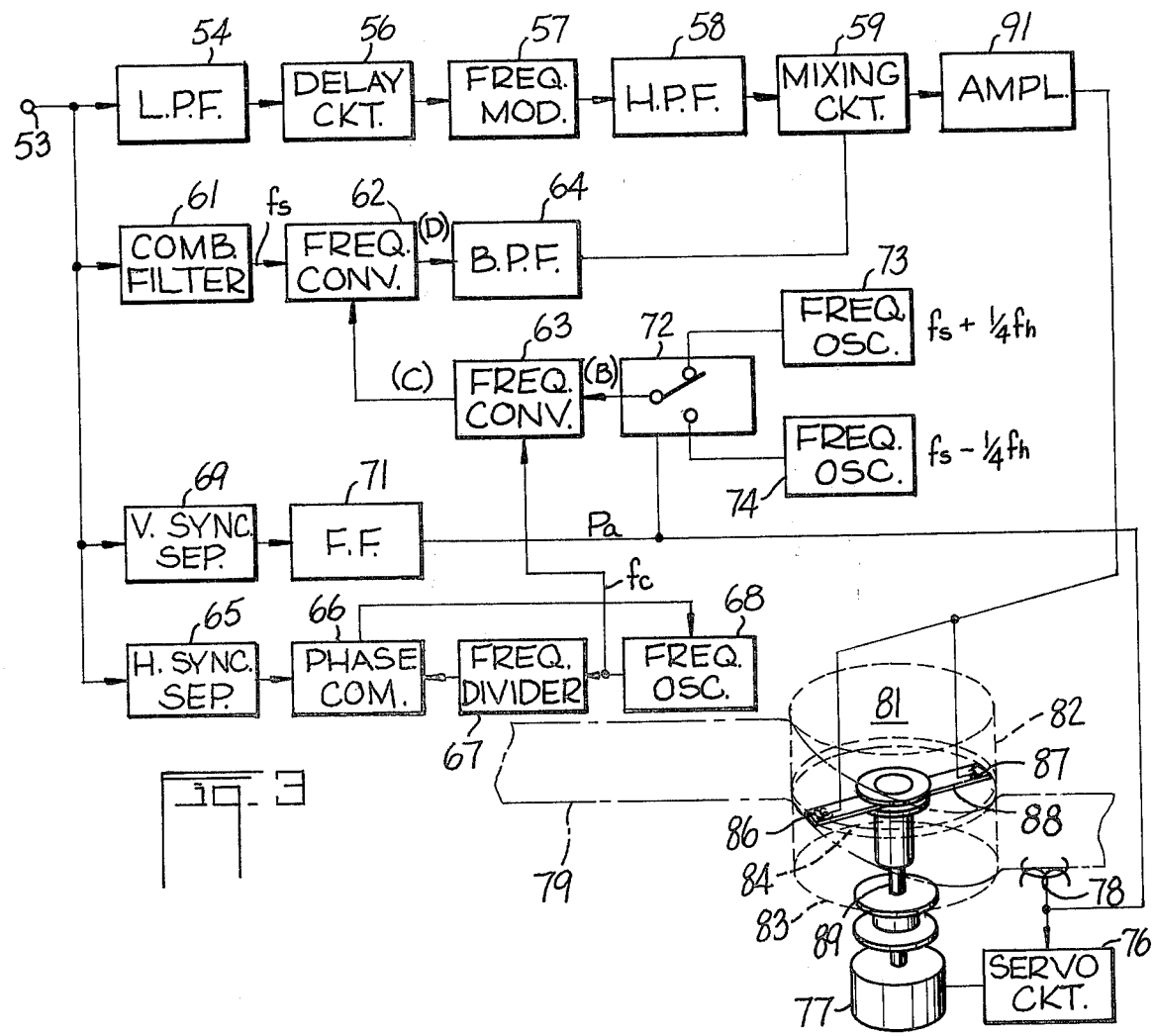

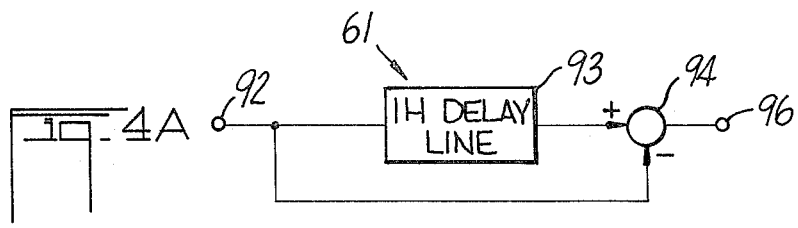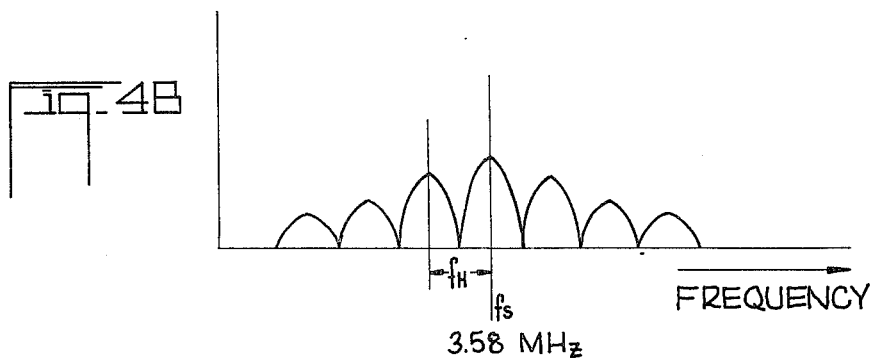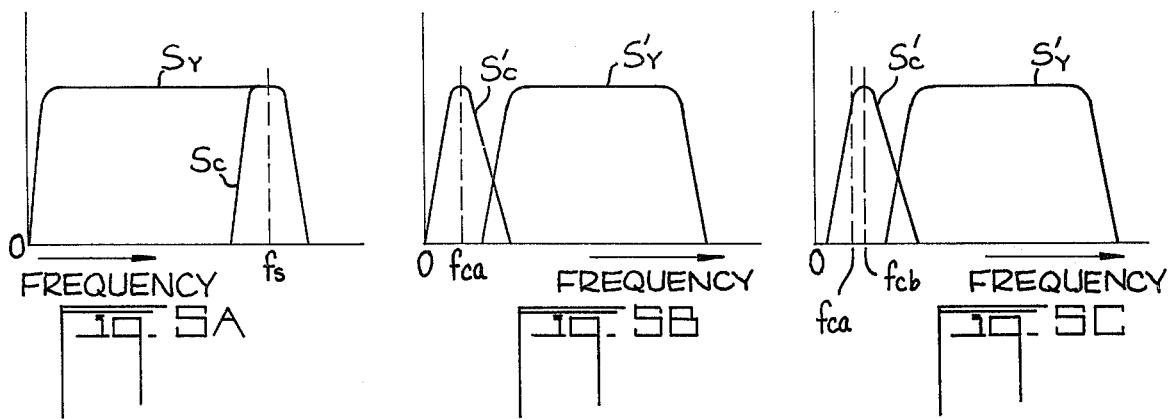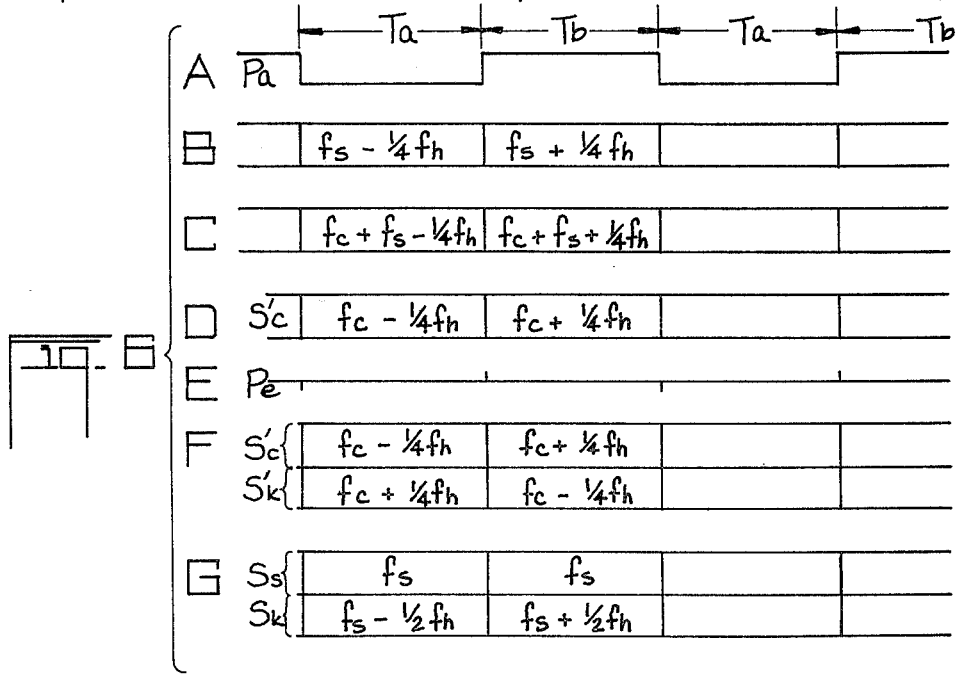

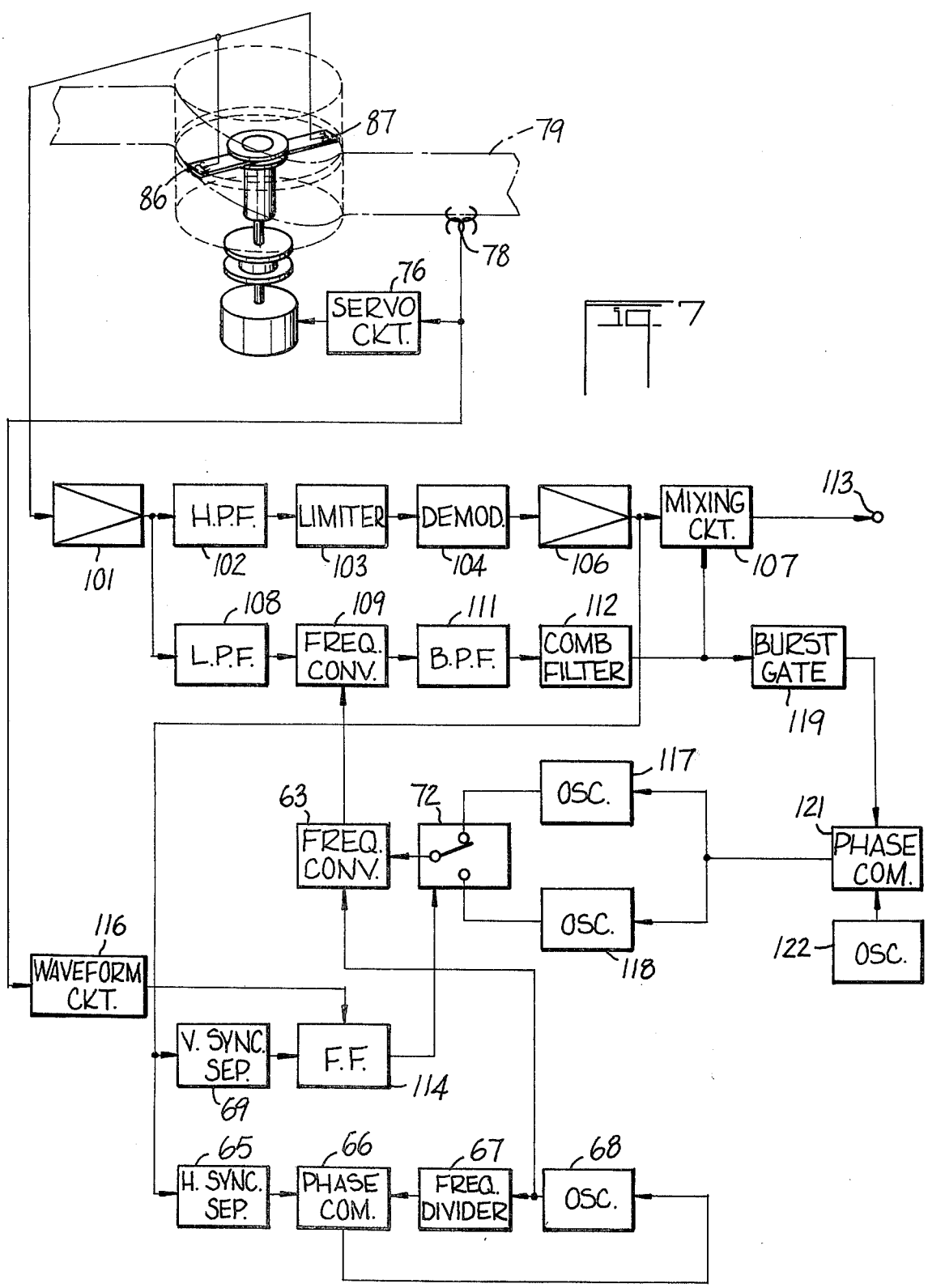

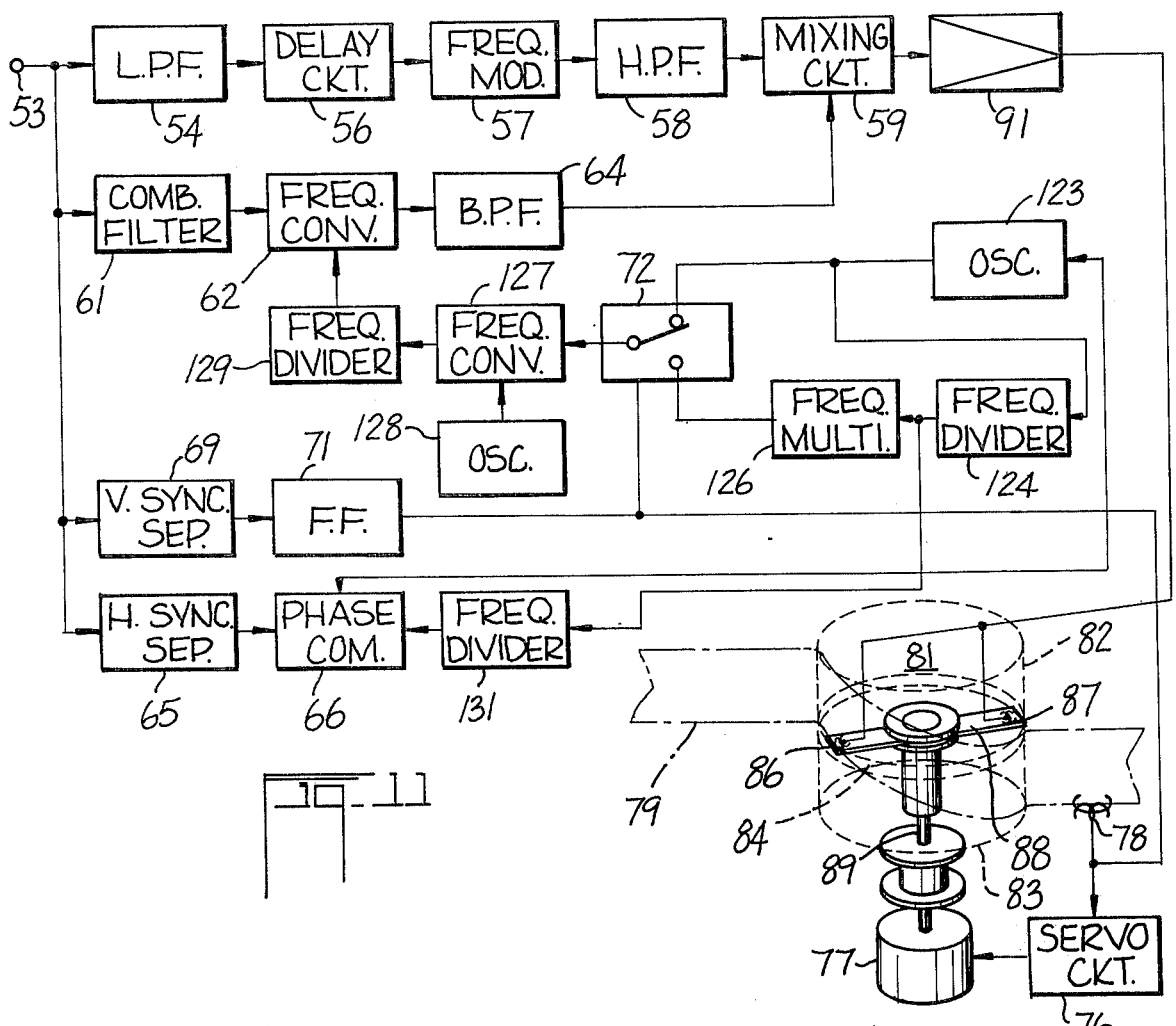
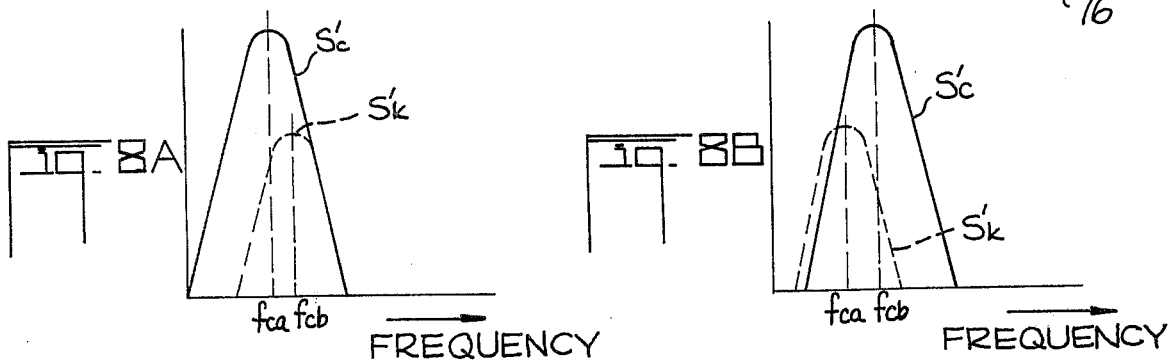
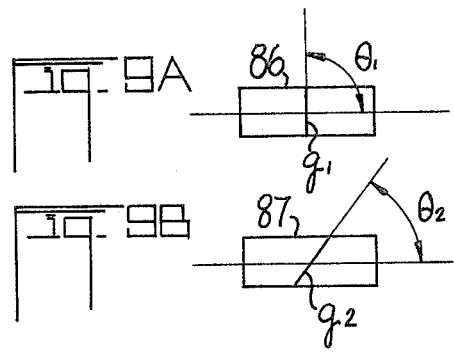
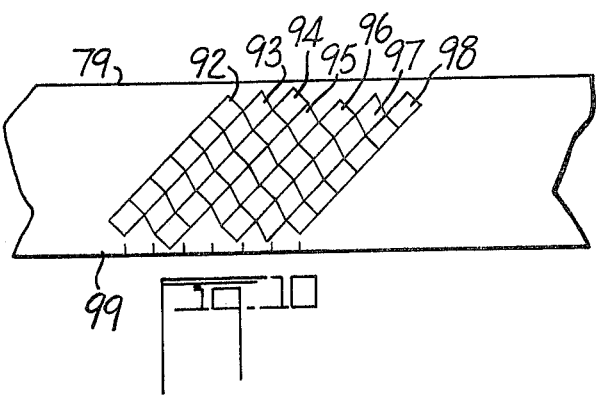

MAGNETIC RECORDING AND/OR REPRODUCING APPARATUS

This is a continuation, of application Ser. No. 492,330, filed July 26, 1974.

BACKGROUND OF THE INVENTION

1. Field of the Invention

This invention relates generally to the recording and reproduction of information signals, such as, for example, color video signals, and more particularly is directed to the reduction of cross-talk in the reproduction of signals recorded in adjacent tracks, even though the relatively low frequency chrominance signal compounds of color video signals are recorded for every line interval and the tracks are very close together, or even may be overlapping.

2. The Prior Art

It is well-known to record video signals on magnetic tape or other forms of record medium by scanning successive parallel tracks on the record medium with one or more transducers energized by the video signals. There has been a constant effort to improve the efficiency of use of the record medium by packing the tracks as close together as possible. The packing density has always been limited by, among other things, the fact that, during reproduction of the recorded signals, a reproducing transducer scanning each of the tracks in order could pick up signals or cross-talk from adjacent tracks.

One effort made to minimize cross-talk has been to use two transducers having air gaps with different azimuth angles for successive lines. This is relatively easy to do because most magnetic recording apparatus for video signals includes a rotary drum provided with two transducers or heads which can have gaps with different azimuth angles. The tape is wrapped helically about a portion of the perimeter of the drum and moved longitudinally along this helical path while the transducers or heads are rotated, thus bringing the heads alternately into recording relationship with the tape and allowing each head to trace out a respective one of the tracks. Each transducer or head has a finite width and thus produces magnetization of those magnetic domains in the material on the tape in what would appear to be, if such domains were visible, a series of parallel lines or stripes, each having a length as great as the width of the track, and each having an orientation that corresponds to the azimuth angle of the gap of the transducer or head used to record that track.

By recording successive alternate tracks with transducers or heads having different azimuth angles, and in view of the fact that the reproducing transducers or heads would also have corresponding azimuth angles, the gap of the reproducing transducers or heads would be aligned with the parallel, but fictitious, lines of the track being scanned thereby, but, because of the difference in azimuth angles, would extend at an angle to such lines of the next adjacent track. If the reproducing transducer overlapped that adjacent track, the well-known azimuth loss would result in attenuation of the signal reproduced from the adjacent track. Even if the reproducing transducer accurately scans a track recorded with the same azimuth, the reproducing transducer may still be influenced by the signals recorded in adjacent tracks with different azimuths, but the azimuth loss will decrease or eliminate the effect of such signals recorded in adjacent tracks on the output signal of the transducer.

Even in the above type of recording with different azimuth angles, there is still a limit to the overlapping or abutting of adjacent tracks. This is due in part to the fact that some of the recorded information may include relatively low frequencies, and the azimuth loss is generally proportional to the frequency of the signals. Thus, interference due to cross-talk from low frequency signals, such as, a frequency converted chrominance signal component, is not reduced to the same degree by the use of transducers having different azimuth angles as cross-talk from high frequency signals, such as a frequency modulated luminance signal component.

One important step in minimizing cross-talk of low frequency information is disclosed in U.S. Pat. Application Ser. No. 277,815, filed Aug. 3, 1972, now U.S. Pat. No. 3,821,787 and assigned to the assignee of the present application. In some embodiments of that earlier application, the relatively high frequency luminance components were recorded during every line area increment on every track, but the low frequency chrominance components were not recorded in adjacent line increment areas of adjacent tracks. The chrominance components were recorded intermittently, usually in alternate line intervals, but also permissibly for every third or fourth line interval or for two or more successive line intervals followed by at least the same number of line intervals in which the chrominance components were not recorded, and in all cases the recording in adjacent tracks was such that chrominance components would not be recorded in adjacent line increments of the respective tracks. If this type of recording were visible, the chrominance components would appear to be recorded in a checkerboard-like pattern. Furthermore, the luminance components could also be recorded intermittently in this same way to permit even further overlapping of adjacent tracks.

In the reproduction of signals recorded with this checkerboard-like pattern, the components that were recorded only intermittently would be utilized directly upon reproduction and would also be delayed for the length of time necessary to permit them to be used during the next succeeding interval in which similar information was not recorded. This system reduced the cross-talk interference but at some sacrifice in the quality of the reproduced image, due to the fact that less information was recorded than was available.

SUMMARY OF THE INVENTION

Accordingly, it is an object of this invention to provide an improved apparatus for recording and/or reproducing periodic information signals, such as video signals having luminance and chrominance components, in successive parallel tracks on a record medium, and in which such tracks can be abutting, that is, not provided with guard bands therebetween, for optimum utilization of the record medium, and further in which the signals reproduced from each of the record tracks are of good resolution or quality and cross-talk from adjacent tracks is reduced or eliminated.

A more specific object of the invention is to provide an improved color video signal recording and/or reproducing system, as aforesaid, in which both luminance and chrominance components of the color video signal can be recorded in adjacent tracks during every line interval, but in such a way that the cross-talk interference of the low frequency components is inherently minimized or can be minimized by simple signal processing.

In accordance with an aspect of this invention, periodic information signals having first intervals and second intervals which are subdivisions of the first intervals, for example, color video signals having field and line intervals, are recorded in respective areas of successive parallel tracks on a record medium with the ends of the margins between the areas in which the second or line intervals are recorded in each of the tracks being aligned, in the direction transverse to the lengths of the tracks, with the adjacent ends of such margins in the next adjacent tracks, and interference or cross-talk between signals recorded in adjacent tracks is reduced or eliminated during reproduction by recording the information signals, and more particularly the chrominance signal components in the case of recording of color video signals, with different first and second carriers in the adjacent tracks, respectively. Such first and second carriers modulated by signals recorded in adjacent tracks, respectively, may be distinguished from each other by their respective frequency and/or polarity characteristics so that, upon reproduction of the signals recorded in a particular track, the cross-talk signals from the tracks next adjacent thereto can be conveniently suppressed or eliminated by reason of the different frequency and/or polarity characteristics of the carriers with which the signals were recorded in that particular track and in the next adjacent tracks, respectively. In any case, when recording color video signals in accordance with this invention, both the chrominance and luminance components are recorded as continuous signals, the word "continuous" being used in the sense that the blanking portion of each line interval is part of the continuous signal.

In the recording and/or reproducing of color video signals according to a particular embodiment of this invention, the chrominance signal components of the video signal to be recorded may be frequency converted so as to selectively produce first and second frequency converted signals which respectively have different carrier frequencies selected to interleave with each other and with any luminance and original chrominance component frequencies with which they might otherwise interfere. Switching or selecting means are provided to allow one or the other of the two frequency converted signals to be recorded in each line area increment of each track, and such switching or selecting means is controlled to provide a pattern of recording in which the frequency converted signal recorded in each line area increment will be different from the frequency converted signal recorded in the adjacent line area increment that would otherwise produce an interfering cross-talk signal. In the simplest pattern of such recording, one of the two frequency converted signals may be recorded in each line area increment of one track and the other frequency converted signal may be recorded in each line area increment of the next adjacent tracks. However, other, more complex patterns could also be selected. During reproducing of the signals thus recorded, the frequency-interleaved relation of the carriers of the frequency-converted signals recorded in adjacent tracks makes it possible to simply minimize or eliminate the cross-talk interference signals, for example, by means of a simple comb filter including a one line delay. However, with the described frequency-interleaved relation of the carriers of the frequency-converted signals with respect to each other and with respect to the luminance and original chrominance signal components, the carrier of one of the reproduced frequency converted signals, as reconverted and supplied to the comb filter, may reverse its phase or polarity for successive line intervals, and this polarity reversal may further account for the suppression by the comb filter of the cross-talk interference signals during reproduction.

In accordance with another embodiment of this invention for recording and/or reproducing color video signals, the chrominance signal components of the video signal to be recorded may be frequency converted so as to selectively produce first and second frequency converted signals which, when considered instantaneously, have the same carrier frequency, but differ from each other in their phase or polarity characteristics. In this case, switching or selecting means are provided to receive both of these frequency converted signals having different polarity characteristics and to allow one or the other of them to be recorded during every line interval. For example, each of the line areas or increments of one track may have recorded therein a frequency converted signal with a carrier of constant polarity, while, in the next adjacent tracks, the carrier of the frequency converted signal recorded therein reverses its polarity for successive line intervals. Again, the pattern of recording is such that, during reproduction, cross-talk effects can be minimized or eliminated, and the carrier-frequency of each frequency converted signal is preferably such as to interleave with potentially interfering signals. Although the first and second frequency converted signals of this embodiment, when considered instantaneously, have the same carrier frequency, the effect of reversing the polarity of the carrier of one of the frequency converted signals for each line appears to be the same as that of balanced-modulating that carrier with a signal having a repetition rate which is one-half the video line repetition rate, and this balanced-modulation effect results in frequency-interleaving of the carriers of the frequency-converted signals recorded in adjacent tracks. In any case, during reproduction of the recorded signals, the reproduced signals of two successive line intervals may be added together by means of suitable delay means, for example, as by a simple comb filter, to cancel out, or at least minimize cross-talk interference signals.

The above, and other objects, features and advantages of the invention, will be apparent in the following detailed description of illustrative embodiments which is to be read in connection with the accompanying drawings.

BRIEF DESCRIPTION OF THE DRAWINGS

FIG. 1 shows a fragment of a record medium illustrating portions of two tracks in which signal information may be recorded;

FIG. 2 is a block diagram of basic components of a recording apparatus according to this invention for minimizing cross-talk interference between frequency converted chrominance components of a video signal;

FIG. 3 is a block diagram of a recording apparatus embodying one of the modes of operation suggested in FIG. 2;

FIGS. 4A and 4B respectively show a comb filter and its frequency response characteristic;

FIGS. 5A-5C are frequency response curves for sections of the circuit shown in FIG. 3;

FIG. 6 is a chart of frequency relationships for FIG. 3;

FIG. 7 is a block diagram of a playback or reproducing apparatus to be used for reproducing signals recorded by the apparatus of FIG. 3;

FIGS. 8A and 8B are response curves for FIGS. 3 and 7;

FIG. 9 shows the transducers used in FIGS. 3 and 7;

FIG. 10 shows a fragment of a recording made by the transducers in FIG. 9;

FIG. 11 is a block diagram of another embodiment of a recording apparatus according to this invention;

DETAILED DESCRIPTION OF THE PREFERRED EMBODIMENTS OF THE INVENTION

Figure 12:
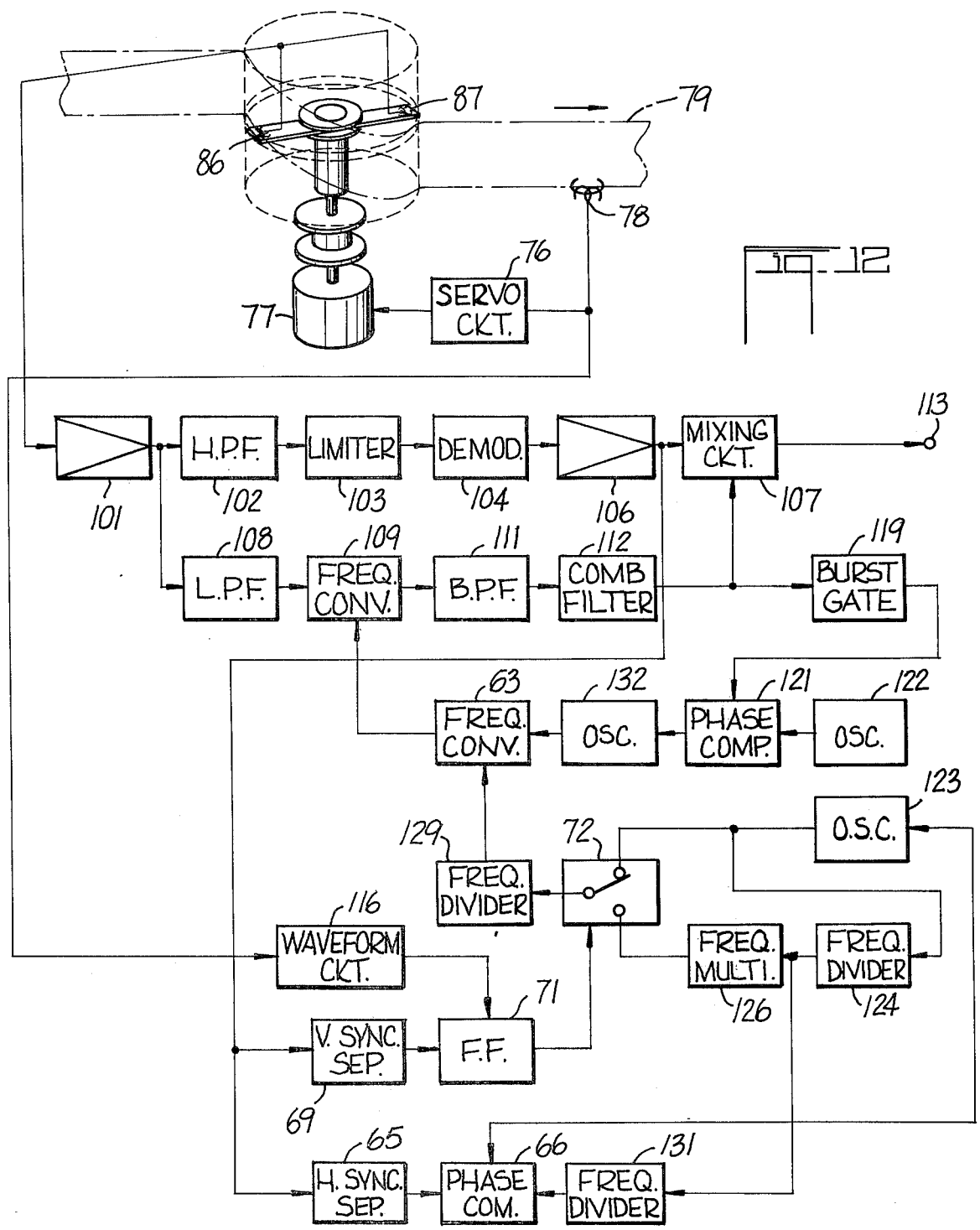
FIG. 12 is a block diagram of a playback apparatus for reproducing signals recorded with the apparatus of FIG. 11.

FIG. 1 shows a section of a record medium 21 on which there are two tracks 22 and 23 recorded in that order due to relative movement in the directions of the arrows 24 and 26 between the medium 21 and recording transducers (not shown). Only two tracks 22 and 23 are shown, although in the normal recording of signal information there would be a large number of such tracks. Each track is divided into areas or increments of which the increments 27–32 are illustrative. Each of these areas or increments has recorded on it the signal information of one interval, for example, a line interval of a video signal that is divided into line intervals and field intervals. Usually, but not necessarily, each track 22 and 23 includes a line increment for each line interval of one field of the television signal.

Each line interval and each field interval contains a blanking and synchronizing portion, and in accordance with accepted practice, the tracks 22 and 23 are shown with the increments 27–32, as well as all of the other increments, arranged in a pattern referred to as H-alignment. This is achieved by regulating the relative movements along the directions 24 and 26 in accordance with the synchronizing portions of the video signal to be recorded so that the section of the increment or area 27, for example, on which the blanking and synchronizing signal is recorded in the track 22 is aligned with the section of the abutting increment or area 28 on which the blanking and synchronizing signal for that line interval is recorded. This reduces the cross-talk of blanking and synchronizing signal information from one track to the other.

The tracks 22 and 23 in FIG. 1 are shown recorded in such a way that they are contiguous. It is assumed that the width of each of the transducers (not shown) used to record the tracks is exactly equal to the width of the respective track 22 or 23. Signals recorded on contiguous tracks as shown in FIG. 1 would produce cross-talk interference from one track to the other during reproduction or playback, because the reproducing transducer (not shown) scanning track 22 would unavoidably be energized slightly by the magnetic field of the adjacent edge of the track 23.

In accordance with accepted practice, the luminance components of a color video signal can be treated separately from the chrominance components. More specifically, the luminance components modulate a carrier so that they are recorded in a higher frequency portion of the available frequency band. If the tracks 22 and 23 are then recorded by respective transducers having different azimuth angles of their respective gaps, and the same azimuth angles are used in transducers respectively reproducing video information recorded in tracks 22 and 23, then the well-known azimuth loss would result in attenuation of the signal reproduced from track 23 during the scanning of track 22. However, the chrominance signal components, in accordance with well-known practice, are frequency converted from a band around the normal chrominance carrier frequency, which in the case of the NTSC signal is approximately 3.58MHz, to a relatively low frequency of about 600 or 700KHz. Since the azimuth loss is generally proportional to the frequency of the signals, the interference due to cross-talk from low-frequency signals, such as the frequency-converted chrominance signal components, is not reduced to the same degree, by the use of transducers having different azimuth angles, as is cross-talk from high frequency signals, such as the frequency-modulated luminance signal components. Thus, even if transducers having different azimuth angles are used for the recording of tracks 22 and 23 on FIG. 1, and then for the reproducing of the recorded signals, chrominance information recorded in the area or increment 28 of track 23 would be picked up by the transducer traversing the area or increment 27 when scanning track 22 and would interfere with the chrominance signal reproduced from the area or increment 27. The reverse would also be true.

In Pat. 3,821,789, supra, such interference between signals from adjacent areas is eliminated by not recording a chrominance signal in the area or increment 28 if a chrominance signal is recorded in the area or increment 27, and vice versa. In accordance with the invention in that application, the recording of chrominance information is alternated such that chrominance information is not recorded in the increment 29 but is recorded in the increment 30. Preferably, but not necessarily, there is chrominance information recorded in the increment 31, and if there is, there would be no chrominance information recorded in the area 32. Under certain conditions it would be preferable not to record information in the increment 31, but instead to record chrominance information in two successive increments 30 and 32. Various other patterns of recording chrominance information are encompassed within that application, but all of them depended upon reproducing the chrominance information that was recorded in one line area or increment, utilizing that information and simultaneously delaying it and then utilizing the delayed replica to fill in the gap in the next line interval, or line intervals, for which the chrominance signal was not recorded. While the chrominance signal does not vary much from line to line, it does vary some, and this use of the same information two times or even more reduces to some degree the quality of reproduction of a color television image, especially the signal-to-noise ratio.

FIG. 2 shows basic components of a circuit in accordance with the present invention to permit successive tracks, such as the tracks 22 and 23 in FIG. 1, to be recorded and to include in every line area or increment of each track both luminance information and chrominance information. The luminance signal is supplied from an input terminal 34 to an angular modulator 36 in which it modulates the phase or frequency of a carrier signal produced within the angular modulator 36. This angular modulated signal is connected to a transducer 37 for recording by the latter on a record medium 38. There is relative movement between the transducer 37 and the medium 38 which may be resolved into movement of the medium along the direction of the arrow 39.

Chrominance components of the video signal corresponding to the luminance components applied to the input terminal 34 are applied to an input terminal 41. This input terminal is connected to frequency conversion means 42 that includes a frequency converter 43, and the output of which is supplied to the transducer 37. In accordance with the usual practice, the chrominance components include a carrier originally having a frequency in the upper part of the video signal band. The chrominance components are clustered around this carrier at frequencies such as to interleave with components in the same part of the frequency band of the original luminance components applied to the input terminal 34. The frequency conversion means 42 is shown generally to include a signal generator 46 that produces either one or two frequency converting signals, depending upon the mode of operation of the system. The frequency converting signal or signals is or are connected to the frequency converter 43 to shift the carrier of the chrominance components to a relatively low frequency band below the band of frequencies occupied by the modulated carrier from the angular modulator 36.

The basic system further includes a synchronizing signal input terminal 47 and a synchronizing circuit 48 to receive synchronizing signals synchronous with selected synchronizing signals of the video signal to be recorded. The synchronizing circuit is connected to switching or selecting circuit means 49 or 51, which are alternatively provided according to embodiments of the invention hereinafter described in detail. Either the switching circuit means 49 is used to control the converting signal input to the converting signal input to the frequency converter 43 or the switching circuit means 51 is used to select the output signal of the frequency converter in the frequency conversion means 42. In one mode of operation, the signal generator 46 produces two frequency converting signals of different frequency, and the switching means 49 is used to apply one or the other of these two signals, alternately, to the frequency converter 43 to convert the chrominance components to one or the other of two frequency bands. As will be described hereinafter, these bands may be almost completely overlapping or they may be substantially separated from each other in frequency. In the case of a system utilizing two different converting frequencies, the frequency-converted chrominance signal recorded on track 22 in FIG. 1 would have one carrier frequency, and the frequency-converted chrominance signal recorded on track 23 would have another carrier frequency. Not only would these carrier frequencies be different from each other but they would be selected to interleave with each other and with the chrominance and luminance components, or at least with the frequencies that those components would occupy if the components were present.

On the other hand, if the system is used in such a way that the signal generator 46 produces only a single frequency converting signal, the frequency converter 43 is arranged to provide two output signals to the switching means 51, one of these output signals being out of phase, or, more correctly, of inverse polarity, to the other. In that case, the signal from the synchronizing circuit 48 controls the switching means 51 to select one or the other of these frequency converted signals of opposite polarity and to apply the selected frequency converted signal to the output terminal 44 to be recorded by the transducer 37. The selection of one or the other of these frequency converted signals would produce a pattern of recording, although not a visible pattern, of the chrominance components in the increments in the tracks 22 and 23. A pattern suitable for minimizing cross-talk between contiguous increments such as the increments 27 and 28 in the tracks 22 and 23 will be described in greater detail hereinafter.

In the more detailed illustration in FIG. 3 of a video tape recording system in accordance with the present invention, a color video signal input terminal 53 is provided to receive a composite video signal that includes both luminance and chrominance components and is composed of line, field, and frame intervals with blanking and synchronizing portions in each of those intervals. A low pass filter 54 connects the input terminal 53 to a delay circuit 56 that, in turn, supplies a signal to a frequency modulator 57. The frequency modulator includes a source for generating a carrier, the frequency of which is to be modulated. The output of the frequency modulator 57 is fed through a high pass filter 58 to a mixing circuit 59.

The input terminal 53 is also connected to a comb filter 61 that separates out the chrominance signal components of the composite video signal. The output of the comb filter 61 is connected to a frequency converter 62, and a frequency converting carrier signal is supplied to the frequency converter 62 from a second frequency converter 63. The frequency converted output signal is supplied from the converter 62 through a band pass filter 64 to the mixer 59.

The input terminal 53 is also connected to a horizontal synchronizing signal separator 65, the output of which is connected to a phase comparison circuit 66 that also receives signals via a frequency divider 67 from an oscillator 68. The phase comparator circuit 66 has its output connected to the oscillator 68 to control the frequency thereof, and the output of oscillator 68 is connected to frequency converter 63.

The input terminal 53 is also connected to a vertical synchronizing signal, or as it is more commonly called, sync, separator circuit 69, the output of which is applied to a flip-flop circuit 71. This flip-flop circuit is connected to a switching or selecting circuit 72 that operates, in effect, as if it were a single-pole, single-throw switch having its poles respectively connected to output circuits of two oscillators 73 and 74.

The flip-flop 71 is also connected to a servo-control circuit 76 that controls the operation of a transducer driving motor 77 in the mechanical part of the system in accordance with standard practice. In addition to being connected to the servo-circuit 76, the flip-flop 71 is also connected to a control signal transducer 78 located to record control signals along one edge of a magnetic tape record medium 79 that is wrapped helically part of the way around a drum 81. This drum comprises an upper portion 82 and a lower portion 83 with a slot 84 therebetween. Two transducers 86 and 87 are located at opposite ends of an arm 88 affixed to the end of a shaft 89 driven by the motor 77. An amplifier 91 connects the mixing circuit 59 to the transducers 86 and 87.

Before describing in detail the operation of this circuit and apparatus in FIG. 3, it is desirable to consider briefly the comb filter 61 which is shown in somewhat greater detail in FIG. 4A. As may be seen, it comprises an input terminal 92 connected to a delay line 93 that delays signals passing through it by one horizontal line interval, which in the case of the NTSC signal is approximately 1/15,750th of a second. Both the input terminal 92 and the output of the 1H delay means 93 are connected to input terminals of a combining circuit 94 that has an output terminal 96.

The response characteristic of the comb filter 61 of FIG. 4A is illustrated in FIG. 4B. As may be seen, the filter 61 transmits most readily those signals close to a frequency $f_s$, which is the carrier frequency of the chrominance components and in the case of the NTSC signal is approximately 3.58MHz. The filter also transmits, with somewhat greater attenuation, signals whose frequency differs from the frequency $f_s$ by a frequency $f_h$, which is the fundamental frequency of the line repetition rate of approximately 15.750KHz. The filter also transmits signals that differ from the frequency $f_s$ by other integral multiples of the frequency $f_h$. These are the frequencies of components of the chrominance signal. However, the filter 61 substantially completely rejects signals having frequencies that differ from the frequency $f_s$ by odd multiples of $\frac{1}{2}F_h$. These are exactly the frequencies of the luminance signal components in the composite video signal. Thus a comb filter is well suited to separate luminance components from chrominance components.

In describing the operation of the circuit in FIG. 3, reference will be made to FIGS. 5A–5C and 6. The band of frequencies of a typical video signal to be applied to the input terminal 53 of the circuit in FIG. 3 is shown in FIG. 5A in which the section indicated as $S_y$ is the band of the luminance components and $S_c$ is the frequency band of the chrominance components clustered around the chrominance carrier having the frequency $f_s$.

For reasons that will be described hereinafter, the frequency of the signal generated by the oscillator 73 is $f_s + \frac{1}{4}f_h$ and that of the oscillator 74 is $f_s - \frac{1}{4}f_h$.

The switching circuit 72 is controlled by a pulse signal $P_a$ that originates in the flip-flop 71 and is illustrated in line A of FIG. 6. The pulse signal $P_a$ is a square wave that has a negative interval $T_a$ which, in the case of recording a field in each of the parallel tracks, is equal in duration to a television field and a positive interval $T_b$ of the same duration as the interval $T_a$. Thus the switching circuit 72 connects the oscillators 73 and 74 alternately to the frequency converter 63 for one field interval at a time. As a result, the frequency of the signal applied through the switching circuit 72 to the frequency converter 63 is illustrated in line B of FIG. 6 as being $f_s - \frac{1}{4}f_h$ for each of the intervals $T_a$, and $f_s + \frac{1}{4}(f_h)$ for each of the intervals $T_b$. As mentioned, this is in accordance with the common practice of recording one field interval, which has a duration equal to the interval $T_a$, on one track, for example the track 22 shown in FIG. 1, and the next field interval, which has a duration equal to the interval $T_b$, on the next track, for example, the track 23.

The oscillator 68 produces a signal having a frequency $f_c$ which is selected to be $nf_h$. A suitable value for $n$ has been found to be 44, so that the frequency of the oscillator 68 is approximately 693KHz. This signal is maintained constant by dividing its frequency by $n$, that is, by 44, in the frequency divider 67 to produce a signal having a frequency $f_h$ and comparing the phase of this signal in the phase comparator 66 with the horizontal sync signal from the separator 65. The output of the phase comparator circuit 66 is applied to control the oscillator 68. The controlled signal at the frequency $f_c$ from the oscillator 68 is applied to the frequency converter 63. This frequency converter 63 is, typically, a balanced modulator, which is arranged to add the frequencies of the signals supplied thereto. For one field interval, indicated in FIG. 6 as the interval $T_a$, the output signal of the frequency converter 63, as indicated in line C of FIG. 6 has frequency $f_c + f_s - \frac{1}{4}(f_h)$, and for the next field interval $T_b$, the frequency of the output signal of the frequency converter is $f_c + f_s + \frac{1}{4}(f_h)$. These two signals are applied, during alternate field intervals, to the frequency converter 62, which is, typically, another balanced modulator arranged to subtract the frequencies of the signals supplied thereto.

The other input signal to the frequency converter 62 is the chrominance signal comprising components clustered around the original carrier frequency $f_s$ and having frequencies that differ from $f_s$ by integral multiples of $f_h$. Thus, in the frequency converter 62 a signal $S_c'$ is produced having components clustered around the frequency $f_c - \frac{1}{4}(f_h)$ during the field interval $T_a$, as shown in line D of FIG. 6, and around the frequency $f_c + \frac{1}{4}(f_h)$ during the interval $T_b$. The frequency band occupied by this signal $S_c'$ is illustrated in FIGS. 5B and 5C. Actually, these are two bands slightly different in frequency from each other. The frequency $f_c - \frac{1}{4}(f_h)$ may be written as $f_{ca}$ and the frequency $f_c + \frac{1}{4}(f_h)$ may be written as $f_{cb}$. FIG. 5C shows the relationship between these frequencies, and both FIGS. 5B and 5C show the band of the frequency modulated signal $S_y'$ produced in the frequency modulator 57 as being almost entirely above the band of the signal $S_c'$.

The purpose of the delay circuit 56 is to assure that the frequency modulated signal $S_y'$ applied through the high pass filter 58 to the mixing circuit 59 arrives at the mixing circuit exactly in time with the frequency converted signal $S_c'$ from the frequency converter 62 as filtered by the bandpass filter 64. The resulting mixed signal is amplified by the amplifier 91 and applied to the transducers 86 and 87 to be recorded on the tape 79.

Face views of the transducers 86 and 87 are shown in FIGS. 9A and 9B to clarify the difference in azimuth angles of their respective gaps $g_1$ and $g_2$. The azimuth angle of the transducer 86 is $\theta_1$ and is 90° in the example shown, while the azimuth angle $\theta_2$ of the transducer 87 is approximately 60°.

FIG. 10 illustrates the recording of several tracks 92–98 on a piece of tape 79 in which the even-numbered tracks are recorded by the transducer 86 of FIG. 9A and the odd-numbered tracks are recorded by the transducer 87 of FIG. 9B. These tracks are recorded by wrapping the tape 79 approximately half-way around the drum 81 in FIG. 3 along a helical path as illustrated. The tape is moved lengthwise at a certain speed and the motor 77 rotates the arm 88 on which the transducers 86 and 87 are mounted. The relative speed of movement of the tape 79 and rotation of the transducers 86 and 87, and the angle of the helix are such that the tracks recorded by the two transducers are contiguous with each other or may even overlap somewhat. At one edge of the tape are control pulses 99 recorded by the control signal transducer 78 in FIG. 3. The tracks 92–98 in FIG. 10 are not to scale, but are illustrative of the recording of several line intervals in respective areas or increments of each track and further illustrative of the effect of the difference in azimuth angles of the transducers 86 and 87. It will be seen that, in this case, the ends of the margins between the areas in which the line intervals are recorded in each of the tracks, for example, in the track 93, are aligned, in the direction transverse to the lengths of the tracks, with the adjacent ends of such margins in the next adjacent tracks, for example, the tracks 92 and 94. Except for the fact that the present invention permits both luminance and chrominance components to be recorded in every line increment of each of the tracks 92–98 even though the tracks are contiguous with each other, the azimuth relationship of the transducers 86 and 87 and the mechanical structure shown in FIG. 3 are in accordance with known practice.

FIG. 7 shows a playback apparatus suitable for reproducing video signals that have been recorded by means of the apparatus of FIG. 3. The mechanical components of the playback apparatus and some of the electrical components are identical with those in FIG. 3 and will be given similar reference numerals. Among these elements are the transducers 86 and 87, which are operated as playback transducers in FIG. 7 and are connected to the input of an amplifier 101. The output circuit of this amplifier is connected through a high pass filter 102 to a limiter 103 that supplies an amplitude-limited signal to a frequency demodulator 104. The demodulator is connected to another amplifier 106 that supplies a signal to a mixing circuit 107.

The amplifier 101 is also connected through a low pass filter 108 to a frequency converter 109, which is connected through a bandpass filter 111 and a comb filter 112 to the mixing circuit 107. The output of the mixing circuit 107 is connected to a reproduced composite video signal output terminal 113 of the playback or reproducing apparatus.

The amplifier 106 is also connected to a horizontal sync separator circuit 65 that may be the same as the correspondingly numbered circuit in FIG. 3. As in FIG. 3, the horizontal sync separator circuit 65 is connected to a phase comparison circuit 66 that receives a signal from the frequency divider 67. The signal to be applied to the frequency divider 67 is generated in the oscillator 68, which is, in turn, controlled by the phase comparator 66.

The output of amplifier 106 is also connected to the vertical sync separator circuit 69, which supplies signals to a flip-flop 114. The flip-flop 114 also receives signals from the control signal transducer 78 via a wave form circuit 116 that may be, for example, a rectifier.

The output of the flip-flop 114 is applied to the switching or selecting circuit 72, which is similar to the switching circuit in FIG. 3 and which receives signals from two oscillators 117 and 118, respectively. The output signal of the switching circuit 72 is connected to the frequency converter 63 that corresponds to the frequency converter 63 in FIG. 3, and the output signal of the frequency converter 63 in FIG. 7 is connected to the frequency converter 109.

The comb filter 112 is also connected to a burst-gate 119, which is connected to a phase comparator circuit 121 that also receives signals from a fixed oscillator 122. The phase comparator 121 is connected to both of the oscillators 117 and 118 to control their operation.

In the operation of the system in FIG. 7, demodulation of the frequency-modulated luminance signal reproduced from the tape 79 by the transducers 86 and 87 and passed through the circuit that includes the amplifier 101, the filter 102, the limiter 103, the demodulator 104, and the amplifier 106 is well-known. The advantage of te invention concerns mainly the handling of the frequency converted chrominance signal components.

The oscillator 68 produces a signal $f_c$ at the frequency $nf_h$, where $n$ is the same integral number 44 as was used in the system in FIG. 3. The oscillators 117 and 118 produce signals having frequencies $f_s - \frac{1}{4}(f_h)$ and $f_s + \frac{1}{4}(f_h)$, respectively. The latter signals are applied alternately to the frequency converter 63 by means of the switching or selecting circuit 72 that reverses at the field repetition rate for the intervals $T_a$ and $T_b$ as shown in FIG. 6 at line A. These signals are alternately combined in the frequency converter 63 with the signal from the oscillator 68 to alternately produce frequency converting signals having the frequencies listed in line C of FIG. 6 as $f_c + f_s - \frac{1}{4}(f_h)$ during the interval $T_a$ and $f_c + f_s + \frac{1}{4}(f_h)$ during the interval $T_b$. These signals are applied alternately to the frequency converter 109 which is arranged to subtract the frequencies of the signals applied thereto.

The frequency converter 109 also receives during alternate field intervals the signals $S_c'$ clustered around the respective carrier frequencies $f_{ca} = f_c - \frac{1}{4}(f_h)$ and $f_{cb} = f_c + \frac{1}{4}(f_h)$, as shown in FIGS. 5B and 5C. The relative timing of the two sets of signals applied to the frequency converter 109 corresponds to the timing of the control signal pulses 99 recorded along the edge of the tape 79 (FIG. 10) by the transducer 78 when it is operating as a recording device in the system in FIG. 3. When the same control transducer 78 is operating as a playback device, the control pulses from it are the pulses $P_e$ in line E of FIG. 6. These pulses are rectified in the waveform circuit 116 so that only the pulses of one polarity are allowed to pass through to the flip-flop 114 where they cooperate with vertical sync pulses from the vertical sync separator 69 to control the phase of the pulse signal $P_a$ in line A of FIG. 6. As a result of this interrelation, during the interval $T_a$ when the signal $S_c'$ in line D of FIG. 6 applied to the frequency converter 109 from the low pass filter 108 has the carrier frequency $f_{ca} = f_c - \frac{1}{4}(f_h)$, the switching circuit 72 will be conductive to signals from the oscillator 117, and as a result the signal supplied by the frequency converter 63 to the frequency converter 109 will have the frequency $f_s + f_c - \frac{1}{4}(f_h)$. These two signals, when subtracted by the frequency converter 109, result in an output signal $S_s$ that includes the original carrier frequency $f_s$ and side bands spaced therefrom by integral multiples of the frequency $f_h$. The signal $S_s$ is referred to on line G of FIG. 6. This frequency reconverted chrominance signal passes through the bandpass filter 111 and through the comb filter 112 to the mixing circuit 107 where it mixes with the demodulated luminance signal from the amplifier 106 to form a reconstituted composite video signal at the output terminal 113.

At the same time that the reproduced chrominance component signal having the carrier frequency $f_c - \frac{1}{4}(f_h)$ characteristic of the track being scanned is applied to the frequency converter 109, a cross-talk interference signal picked up from the adjacent recorded track and having frequency converted chrominance components with a carrier frequency $f_c + \frac{1}{4}(f_h)$ is also being applied to the frequency converter 109. The cross-talk interference signal is identified in line F of FIG. 6 and in FIG. 8A as the signal $S_k{'}$. As shown in FIG. 8A, the amplitude of the cross-talk signal $S_k{'}$ is substantially less than the amplitude of the desired signal $S_c{'}$, and this difference in amplitude is beneficial in avoiding an interference effect from the signal $S_k{'}$. Of more significance is the frequency interleaving relationship between the signals $S_c{'}$ and $S_k{'}$.

This frequency interleaving relationship causes the incorrect, or undesired, frequency converted chrominance component signal, that is, the cross-talk signal, applied to the frequency converter 109 to be converted therein from the signal $S_k{'}$ in line F of FIG. 6 to the signal $S_k$ in line G of FIG. 6, where it is shown to have a carrier frequency $f_s - \frac{1}{2}(f_h)$. As may be seen in FIG. 4B, such a carrier frequency corresponds to a node in the response curve of the comb filter 112 and therefore will be greatly attenuated by the filter. The frequency response of this filter is $\sqrt{2(1-\cos w/f_h)}$. In addition, all of the side bands of the undesired frequency converted signal $S_k$ will be at frequencies that are greatly attenuated by the comb filter 112.

The comb filter 112 produces the same beneficial elimination of interference or cross-talk chrominance component signals during the interval $T_b$ as during the interval $T_a$. During the interval $T_b$, the desired frequency converted chrominance component signal $S'_c$ in lines D and F of FIG. 6 has the carrier frequency $f_{bc} = f_c + \frac{1}{4}(f_h)$ while the cross-talk signal $S'_k$ in line F of FIG. 6 and shown in FIG. 8B has the carrier frequency $f_{ac} = f_c - \frac{1}{4}(f_h)$. The desired signal is converted by the frequency converting signal $f_c + f_s - \frac{1}{4}(f_h)$ from frequency converter 63, that is, the sum of the signal $f_s + \frac{1}{4}(f_h)$ from the oscillator 118 and the signal $f_c$ from the oscillator 68, to produce, at the output of the frequency converter 109 the desired chrominance signal $S_s$ having the original carrier frequency $f_s$ as illustrated in line G of FIG. 6. At the same time the undesired chrominance component signal picked up as cross-talk interference, and having the carrier frequency of $f_c - \frac{1}{4}(f_h)$, is frequency converted in frequency converter 109 into the signal $S_k$ in line G of FIG. 6 with a carrier frequency $f_s + \frac{1}{2}(f_h)$. As may be seen in FIG. 4B, this carrier frequency is above the frequency $f_s$ but is also a frequency that is greatly attenuated by the comb filter 112, as are all of the side bands of the frequency converted cross-talk signal.

Thus, the comb filter 112 greatly attenuates cross-talk interference chrominance signals while transmitting the desired chrominance component signals, no matter whether the desired signals have a higher or a lower carrier frequency than the undesired interference signals. The only requirement is that the carriers of the desired and undesired signals have a frequency-interleaving relationship with each other. This relationship requires that the two carrier signals of the frequency converted chrominance components have the relationship:

$$f_{ca} - f_{cb} = \frac{1}{2}(2k-1)f_h$$

In the system of FIGS. 3 and 7, $k$, which could be any integer, is 1. The frequencies $f_{ca}$ and $f_{cb}$ are:
$f_{ca} = nf_h - \frac{1}{4}f_h$
$f_{cb} = nf_h + \frac{1}{4}f_h$ The output signal of the comb filter 112 is also applied to the burst gate 119 that passes only the burst signals that have been reconverted to the frequency $f_s$. These signals are compared in the phase comparison circuit 121 with a fixed frequency signal $f_s$ from the oscillator 122 and the output of the phase comparator 121 is applied to both of the oscillators 117 and 118. It does not matter that the oscillators 117 and 118 have different frequencies. The correction signal applied to both of these oscillators during the period that the oscillator 117 is connected to the frequency converter 63 by the switching means 72 is determined by the phase comparator 121 as if the oscillator 118 did not exist. In a corresponding manner, the control signal applied to both of the oscillators by the phase comparator 121 during the time that the oscillator 118 is connected to the frequency converter 63 is determined as if the oscillator 117 did not exist.

FIG. 11 shows a modified recording system in which many of the components are identical with those in FIG. 3 and will not be described again. The components that do differ from those in FIG. 3 are the components associated with the production of the frequency converting signals to be applied to the frequency converter 62.

The system in FIG. 11 has an oscillator 123 that produces a signal that is connected directly to one of the input terminals of the switching or selecting circuit 72 and is also connected to a frequency divider 124. A frequency multiplier 126 connects the output of the frequency divider 124 to the other input terminal of the switching circuit 72. The output terminal of the switching circuit 72 is connected to a frequency converter 127 that also receives a frequency converting signal from a fixed frequency oscillator 128. Due to the frequency selected for the oscillator 123, a frequency divider 129 is connected between the frequency converter 127 and the frequency converter 62.

The output of the frequency divider 124 is also connected to a frequency divider 131, which is connected in turn to the phase comparator 66. The output of the phase comparator 66 is supplied back to the oscillator 123 to control its operation.

As in the system in FIG. 3, the frequency converter 62 alternately produces frequency converted chrominance signals $S'_c$ shown in FIGS. 5B and 5C to have the carrier frequencies $F_{ca}$ and $F_{cb}$, respectively, that have an interleaving relationship so that the side bands of these frequency converted carrier interleave with each other. For simplicity of the circuits, the frequencies $F_{ca}$ and $F_{cb}$ produced by the system in FIG. 11 are not as close as the frequencies $f_{ca}$ and $f_{cb}$ in the system in FIG. 3. The oscillator 123 is chosen to have a frequency $4F_{cb}$. This signal is divided by 7 in the frequency divider 124 and the divided frequency is multiplied by 5 in the frequency multiplier 126 to produce a signal having a frequency defined as $4F_{ca}$, which is 5/7th as great as the frequency $4F_{cb}$ from the oscillator 123. These signals having frequencies $4F_{cb}$ and $4F_{ca}$ are applied during alternate field intervals $T_b$ and $T_a$ shown in FIG. 6 to the frequency converter 127 that also receives a fixed signal having a frequency $4f_s$ from the oscillator 128 and is arranged to add the frequencies of the signals supplied thereto. Thus, the output signal of the frequency converter 127 during one field interval includes the component $4(f_s + F_{cb})$ and, during the next field interval, has a component with a frequency $4(f_s + F_{ca})$. The frequency of the output signal of the frequency converter 127 is divided by 4 in the frequency divider 129 so that the signal applied to the frequency converter 62 is either $f_s + F_{ca}$ or $f_s + F_{cb}$. These signals produce a converted chrominance component signal at the output of the bandpass filter 64 which, during alternate field intervals, has the carrier frequency $F_{ca}$ and the carrier frequency $F_{cb}$, respectively.

The output signal of the frequency divider 124 is divided by 29 in the frequency divider 131 to an output frequency of $f_h$. This output signal is compared with the line frequency $f_h$ in the phase comparator 66 to produce a control signal that is fed back to the oscillator 123 to control its operation.

Instead of connecting the switching circuit 72 directly to the frequency converter 127 and dividing the frequency of the output signal of the frequency converter in the divider 129, the frequency divider 129 may be connected between the switching circuit 72 and the frequency converter 127. In that case, the oscillator 128 must produce a signal having a frequency $f_s$ instead of $4f_s$.

The frequencies $F_{ca}$ and $F_{cb}$, although generally related in the same manner as the frequencies $f_{ca}$ and $f_{cb}$ in the system in FIG. 3, are somewhat farther apart in actual frequency. However, they still retain the interleaving relationship. Where the frequencies $f_{ca}$ and $f_{cb}$ in the system in FIG. 3 differed only by $\frac{1}{2}(f_h)$, the frequency $4F_{cb}$ generated by the oscillator 123 is $203(f_h)$, which corresponds to the fact that it is divided by 7 in the frequency divider 124 and the output of that divider is further divided by 29 in the frequency divider 131 to reach the frequency $f_h$. The frequency $4F_{ca}$ is 5/7th the frequency $4F_{cb}$, or $145(f_h)$. Thus, the frequency difference between the frequencies $4F_{cb}$ and $4F_{ca}$ is $58(f_h)$, and when this difference is divided by 4 in the frequency divider 129, it turns out that the frequency difference between $F_{cb}$ and $F_{ca}$ in FIG. 11 is $$14\tfrac{1}{2}(f_h).$$

The response curves shown in FIGS. 5B, 5C, 8A, and 8B are still applicable to the signals produced by the system in FIG. 11, since the response curves are not drawn to a precise frequency scale. The frequency $F_{cb}$ produced in the system in FIG. 11 is $$50\tfrac{3}{4}(f_h),$$

which is approximately 799KHz. Ever with a frequency converted carrier of 799KHz, there is still an acceptable separation between the frequency modulated luminance band $S'_y$ and the frequency converted chrominance $S'_c$.

The equation for determining interleaving of the signals $F_{cb}$ and $F_{ca}$ in the system of FIG. 11 is still:

$$F_{cb} - F_{ca} = \tfrac{1}{2}(2k - 1)f_h,$$

but whereas $k$ was 1 in the system in FIG. 3, it has been selected to be 15 in the system in FIG. 11. In order to produce a frequency difference which is an odd multiple of $\frac{1}{2}(f_h)$, as is required for interleaving, both the frequencies $F_{cb}$ and $F_{ca}$ must be odd multiples of $\frac{1}{4}(f_h)$. The frequencies are:

$$F_{ca} = \tfrac{1}{4}(2x - 1)f_h$$

and $$F_{cb} = \tfrac{1}{4}(2y - 1)f_h$$

where $x$ is 73 and $y$ is 102. Thus, $$F_{ca} = \tfrac{1}{4}(2 \times 73 - 1)f_h = \tfrac{1}{4} \times 145 f_h = \tfrac{1}{4} \times 5 \times 29 f_h$$

and $$F_{cb} = \tfrac{1}{4}(2 \times 102 - 1)f_h = \tfrac{1}{4} \times 203 f_h = \tfrac{1}{4} \times 7 \times 29 f_h.$$

FIG. 12 shows an apparatus for reproducing signals recorded by the apparatus of FIG. 11. Many of the components of FIG. 12 are identical with those in the playback or reproducing apparatus in FIG. 7 and others are identical with components in FIG. 11. The description of such components and their operation will not be unnecessarily repeated.

In order to reconvert the frequency converted chrominance signal components of signals recorded by the apparatus of FIG. 11, the frequency converter 109 in FIG. 12 is supplied during alternate field intervals with frequency converting signals having frequencies $f_s + F_{ca}$ and $f_s + F_{cb}$, respectively. These frequency converting signals are generated in the same way as in the system in FIG. 11 by means of the oscillator 123 that produces a signal having a frequency $4F_{cb}$ which is applied to one input terminal of the switching circuit 72 and is divided by 7 in the frequency divider 124 and is multiplied by 5 in the frequency multiplier 126 to produce a signal having the frequency $4F_{ca}$ at the other input terminal of the switching circuit 72. The output signal of the switching circuit is divided by 4 by the frequency divider 129 to produce signals having frequencies $F_{ca}$ and $F_{cb}$ to be applied to the frequency converter 63. The frequency converter 63 also receives signals from an oscillator 132 at the frequency $f_s$, thus causing the frequency converter 63 to produce the required two output signals alternately having the frequency $f_s + F_{ca}$ and the frequency $f_s + F_{cb}$, respectively.

The switching circuit 72 is controlled by the flip-flop 71 which in turn is controlled by the waveform circuit 116. This circuit 116 operates in the same manner as the corresponding circuit in FIG. 7 to rectify pulses picked up by the control signal transducer 78 and to select pulses of only one polarity occurring at alternate field intervals. As a result, the proper frequency converting signals are applied to the frequency converter 109 to produce reconverted chrominance signals that have the correct carrier frequency $f_s$ to pass through the comb filter 112. The undesired cross-talk interference signals applied to the frequency converter 109 at the same time have a carrier frequency that differs from the correct carrier frequency by $\frac{1}{2}(29f_h)$. These signals may be partially attenuated by the bandpass filter 111 because of their substantial difference in frequency, and, since they differ from the frequencies of the desired chrominance components by an odd multiple of $\frac{1}{2}(f_h)$, they will also be strongly attenuated by the comb filter 112.

As in the circuit in FIG. 7, the burst signals of the reconverted chrominance signal components are allowed to pass through the burst gate 119 to phase comparator 121, which is also supplied with a signal having the same frequency $f_s$ from the oscillator 122. The output of the phase comparator 121 is used to control the operation of the oscillator 132.

Figure 13:
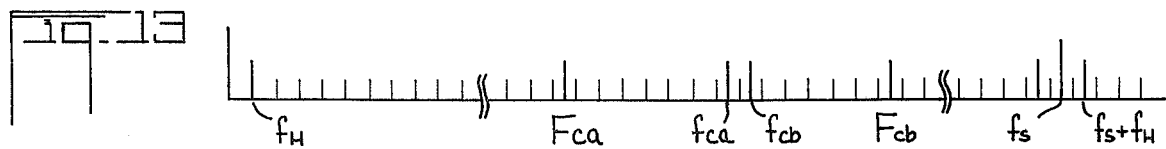
FIG. 13 is a graph of a frequency spectrum illustrating a difference between the apparatus of FIGS. 3 and 11.

FIG. 13 illustrates the difference between the frequencies $f_{ca}$ and $f_{cb}$ of the frequency converted carriers of the apparatus of FIGS. 3 and 7 as compared with the frequencies $F_{ca}$ and $F_{cb}$ of the frequency converted carriers of the apparatus in FIGS. 11 and 12. The frequencies $f_{ca}$ and $f_{cb}$ are spaced $\frac{1}{4}(f_h)$ on each side of the 44th harmonic of the line frequency $f_h$ while the frequency $F_{ca}$ is $\frac{1}{4}(f_h)$ above the 36th harmonic and the frequency $F_{cb}$ is $\frac{1}{4}(f_h)$ below the 51st harmonic.

Figure 14:
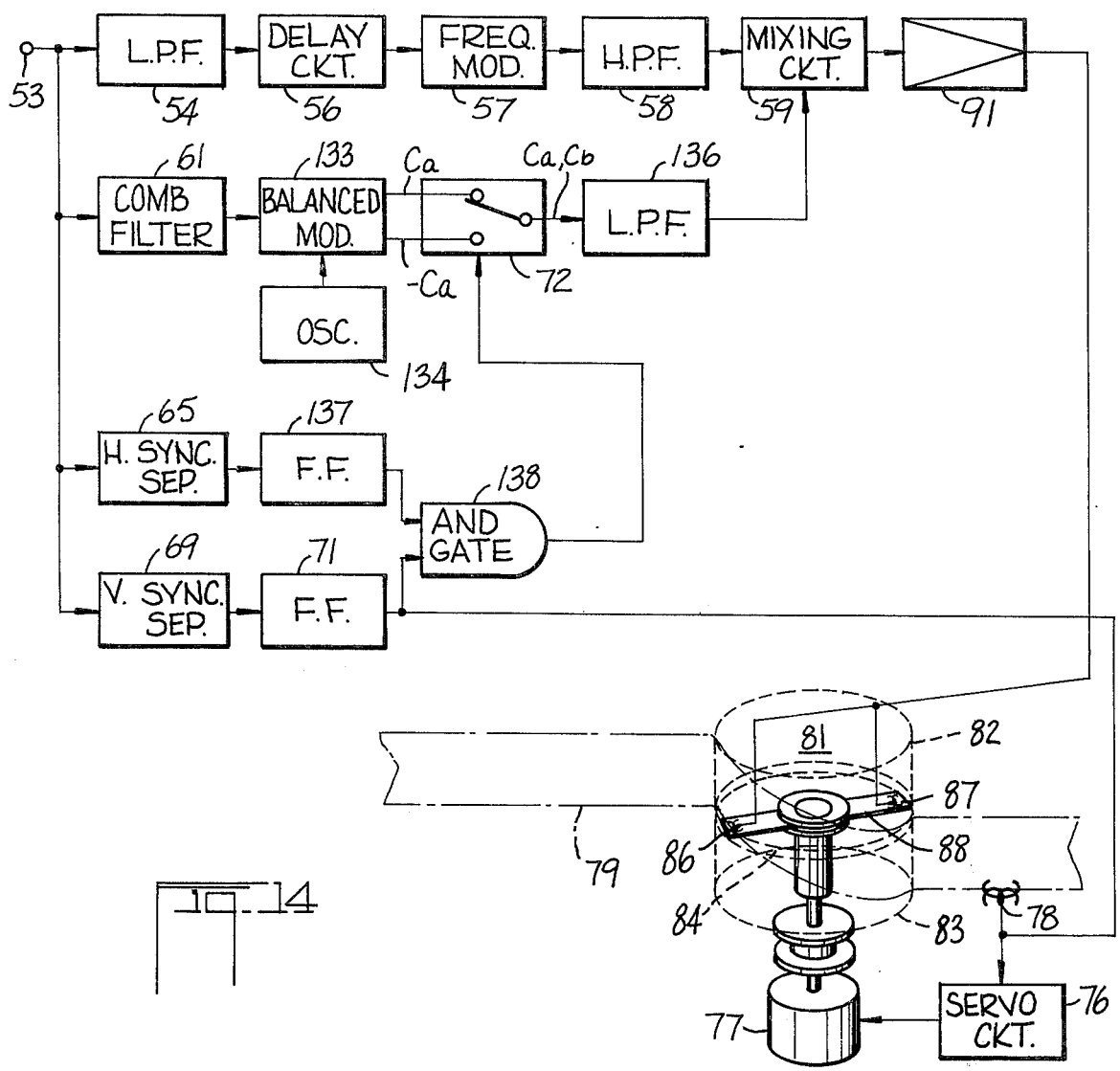
FIG. 14 is a block diagram of still another embodiment of a recording apparatus according to this invention.

FIG. 14 shows another embodiment of an apparatus according to the invention for recording video signals on closely spaced tracks on a record medium while minimizing the interference of cross-talk signals from adjacent tracks during reproducing even though both luminance components and chrominance components are recorded in each line area or increment of each of the tracks. The part of the apparatus of FIG. 14 for frequency modulating a carrier by means of the luminance signal component and recording the frequency modulated signal is the same as that shown in FIGS. 3 and 11 and need not be described again.

In FIG. 14 the composite video signal is also applied to the comb filter 61 which passes the chrominance signal components to a balanced modulator 133. An oscillator 134 is also connected to the balanced modulator 133. The modulator 133 has two output terminals connected to the fixed terminals of the single-pole, double-throw switch or selecting device 72 and the arm of this switch is connected to a low pass filter 136 which is connected in turn to the mixing circuit 59.

The composite video signal is also supplied from the input terminal 53 to the horizontal sync separator 65 and to the vertical sync separator 69. The horizontal sync separator 65 is connected to a flip-flop 137 and the vertical sync separator 69 is connected to the flip-flop 71. Both of these flip-flops are connected to an AND gate 138 the output of which is connected to control the switching or selecting circuit 72. The flip-flop 71 is also connected to the servo-circuit 76 and to the control signal transducer 78 to record control signals along one edge of the tape 79.

In the operation of the apparatus shown in FIG. 14, the oscillator 134 generates a signal having a fixed frequency $f_c$ and this signal combines, in the balanced modulator 133, with the chrominance signal components that pass through the comb filter 61 to the balanced modulator. The balanced modulator 133, which is arranged to subtract the frequencies of the signals supplied thereto, produces two output signals indicated as $C_a$ and $-C_a$ which are, as the minus sign indicates, of opposite polarity, although they may be considered to be 180° out of phase. Each of these signals has the same carrier frequency $f_a$, when considered instantaneously, and they are selected alternately by the switching circuit 72 to be applied to the low pass filter 136 that eliminates undesired side bands and applies only the proper frequency converted chrominance component signal to the mixing circuit 59.

Figure 15:
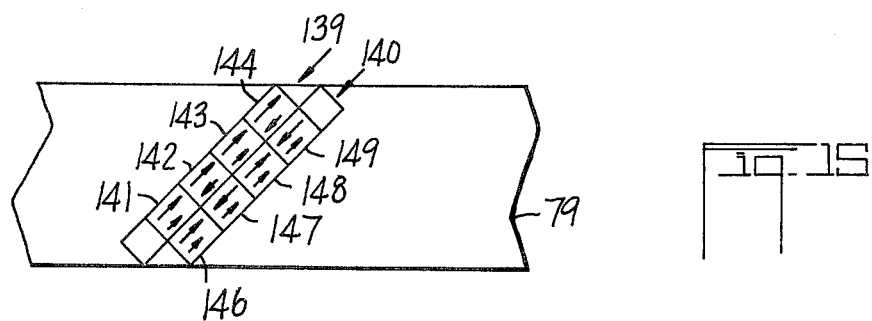
FIG. 15 shows a fragment of a recording made by the apparatus of FIG. 14.

The operation of the switching circuit 72 to select either signal $C_a$ or signal $-C_a$ is controlled by the AND gate 138 in response to output signals from the flip-flops 71 and 137. The selected pattern of recording of the signals $C_a$ and $-C_a$ is illustrated in FIG. 15 which shows a short length of the tape 79 with two adjacent tracks 139 and 140 recorded on it. The track 139 is shown with four line areas or increments 141–144 and the track 140 is shown with four line areas or increments 146–149 which are disposed so that the ends of the margins therebetween are aligned, transversely to the lengths of the tracks, with the adjacent ends of the margins between line areas 141–144, respectively, of the track 139. Each of the line areas 141–144 and 146–149 has two arrows in it, the larger of which indicates the polarity of the carrier of the frequency converted chrominance component recorded therein, and the smaller of which indicates the polarity of the carrier of the cross-talk interference signal, which is the frequency converted chrominance components signal in the next adjacent line area of the adjacent track.

Examination of track 139 indicates that all of the frequency converted chrominance component signals recorded therein have a carrier of the same polarity. This may be either the polarity of the signal $C_a$ or of the signal $-C_a$. For the sake of simplifying the explanation it will be assumed that the polarity of the larger arrows in the track 139 indicates that the signal $C_a$ is recorded in all of the line increments 141–144. In the track 140 the polarity of the carrier is reversed in alternate line areas or increments, that is, in line areas 146 and 148, the signal $C_a$ is recorded and in line areas 147 and 149 the signal $-C_a$ is recorded.

Figure 16:
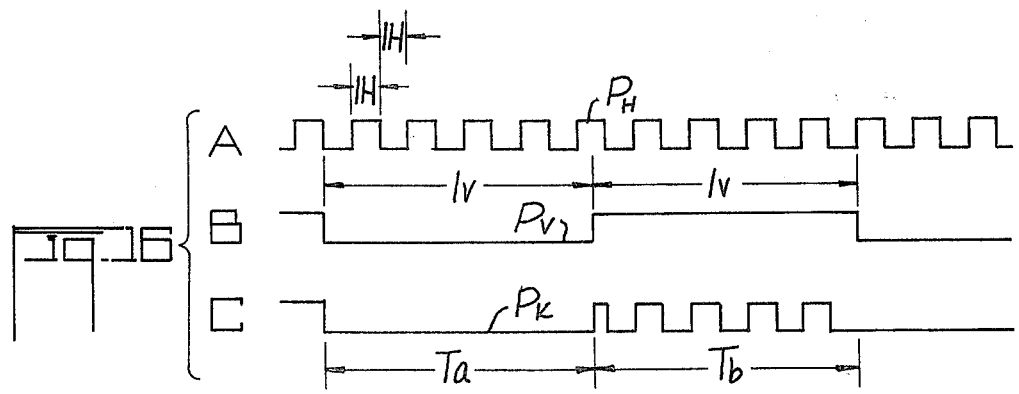
FIG. 16 is a set of waveforms to which reference will be made in explaining the operation of the apparatus of FIG. 15.

In order to record the signals $C_a$ and $-C_a$ in the pattern set forth in FIG. 15, the simple logic circuit involving the AND gate 138 is used. Line A of FIG. 16 shows the output signal $P_h$ of the flip-flop 137 as being a square wave having high and low intervals, each equal to one line interval, or 1H. One complete cycle of the signal in line A of FIG. 16 thus has a fundamental frequency $\frac{1}{2}(f_h)$. The output signal of the flip-flop 71 is shown in line B of FIG. 16 as a square wave $P_v$ having high and low intervals each equal to 1V, where V is a field interval.

Since the AND gate 138 can produce a high output only when both of the applied signals $P_h$ and $P_v$ are high, the output of the AND gate, as is shown in line C of FIG. 16, remains low during one entire field interval $T_a$ and goes high only during alternate line intervals of the alternate field interval $T_b$. The pattern shown in FIG. 15 corresponds to having the arm of the switching circuit 72 apply the signal $C_a$ to the low pass filter 136 when the output of the AND gate 138 is low and having the arm apply the signal $-C_a$ to the low pass filter 136 when the output of the AND gate 138 is high.

Figure 17:
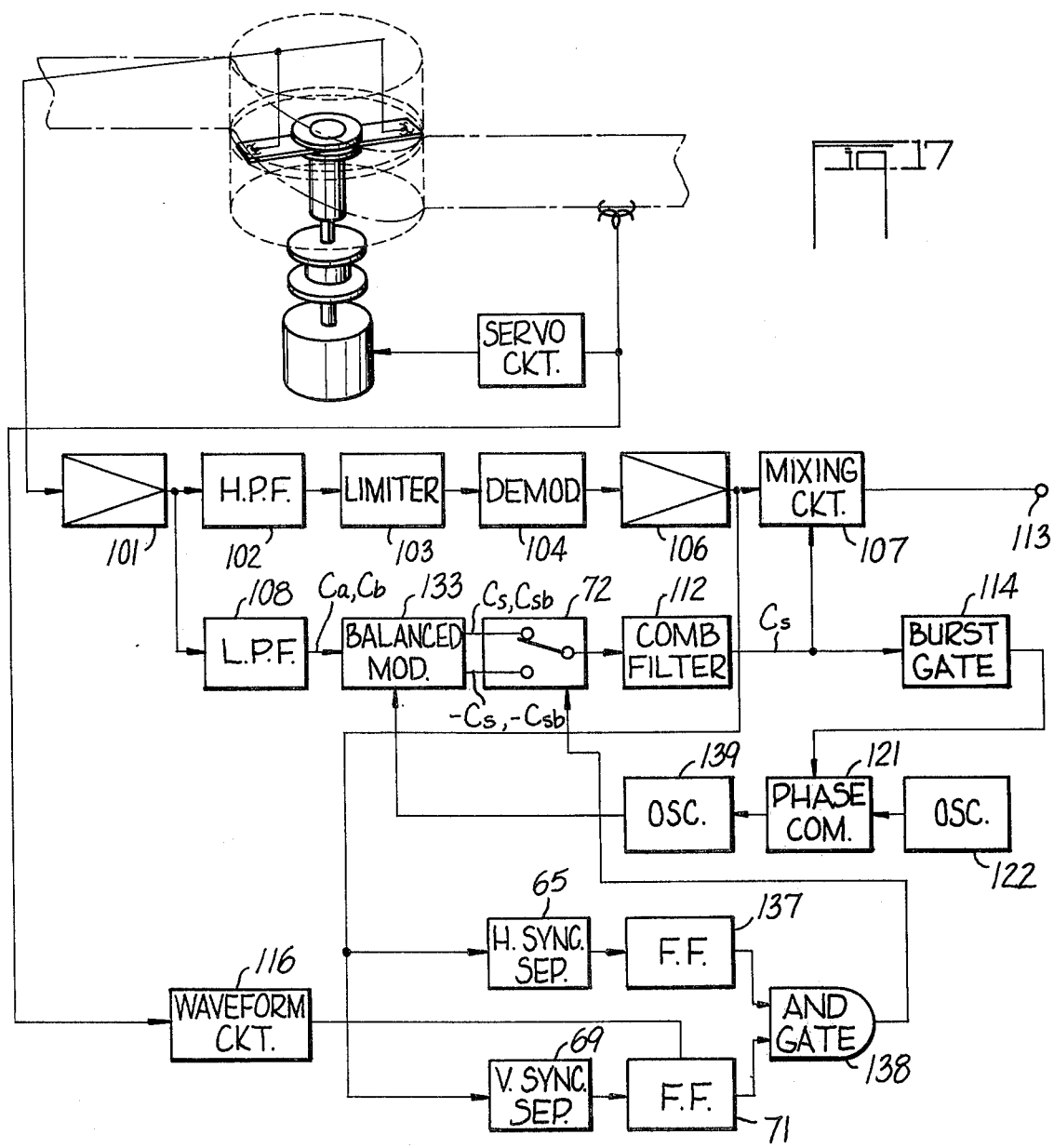
FIG. 17 is a block diagram of a playback apparatus for reproducing video signal recorded by the apparatus of FIG. 14.

FIG. 17 shows a playback apparatus for reproducing video signals recorded by the apparatus of FIG. 14. Many of the components in FIG. 7 are identical with those in FIG. 12 and others are identical with those in FIG. 14. Such identical components are indicated by the same reference numerals as in the earlier figures and descriptions of such elements and their operation will not be unnecessarily repeated.

The reproduced frequency converted chrominance signal separated by the low pass filter 108 and made up, alternatively, of the signals $C_a$ and $C_b$ is applied to a balanced modulator 133 along with a signal from an oscillator 139. The signal from oscillator 139 has a frequency $f_s + f_a$ and is constant during all line and field intervals. The phase comparator circuit 121 is connected to the oscillator 139 to control its operation.

The operation of the system in FIG. 17, insofar as the chrominance component signal is concerned, consists in applying the signal having the frequency $f_s + f_a$ from the oscillator 139 to the balanced modulator 133 to convert the frequency $f_a$ of the signals $C_a$ and $C_b$ which are applied alternatively to the balanced modulator back to the original chrominance carrier frequency $f_s$. The two output terminals of the balanced modulator 133 provide signals of opposite polarity. One of them includes the desired signal $C_s$ and the undesired or cross-talk signal $C_{sb}$, while the other includes the desired signal $-C_s$ and the undesired or cross-talk signal $-C_{sb}$. The switching circuit 72 is controlled by the horizontal and vertical sync separators 65 and 69 and the respective flip-flop circuits 137 and 71 controlling the AND gate 138 to produce exactly the same switching pattern as is shown in line C of FIG. 16. As in previous playback systems, the waveform circuit 116 assures that the operation of the flip-flop 71 in the playback unit corresponds to the operation of the flip-flop 71 in the recording system of FIG. 14.

The output of the switching circuit 72 is applied to the comb filter 112. It will be recalled that the comb filter, as shown in FIG. 4A, includes both a direct signal path and a path in which the signal is delayed by one horizontal line interval. Thus, when the chrominance component signals of the track 139 in FIG. 15 are being reproduced, the desired chrominance component signals in two successive line areas 141 and 142 or 142 and 143 or 143 and 144 are combined, with the polarities of their carriers being the same, at the output of the comb filter. However, the undesired or cross-talk components indicated by the small arrows in the line increments have carriers of opposite polarities in successive pairs of lines, and thus cancel each other when combined at the output of the comb filter 112. As a result, the output signal of the comb filter 112 in FIG. 17 during the reproduction of the track 139 consists substantially only of the desired chrominance components $C_s$ having the proper carrier frequency $f_s$. During the reproduction of the track 139, the switching circuit 72 does not switch back and forth between its two input terminals but remains on only one terminal as indicated during the interval $T_a$ in FIG. 16.

During reproduction of the track 140, the switching circuit 72 does switch back and forth at the end of each line interval of time in accordance with the output signal of the AND gate 138 during the interval $T_b$ as indicated in line C of FIG. 16. Thus, the comb filter 112 receives the signals $C_s$ and $C_{sb}$, during one line interval, for example, corresponding to the line area 146, and the signals $-C_s$ and $-C_{sb}$ during the next succeeding line interval, for example, corresponding to the line area 147. This is the equivalent of inverting the signal received during the line interval that corresponds to the line area 147. Since the chrominance signal components recorded in line areas 146 and 147 have carriers with reversed polarities, respectively, such inverting of the signal reproduced from line area 147 causes the chrominance components signal reproduced from line area 147 to be combined, in phase, with the delayed chrominance component signal reproduced from line area 146 at the output of comb filter 112. However, since the chrominance component signals are recorded in all line areas of the next adjacent track 139 with carriers of the same polarity, the cross-talk signals from track 139 which are reproduced with the chrominance component signals recorded in the successive line areas of the track 140 also have carriers of the same polarity. Therefore, the above mentioned inverting of the signal reproduced from line area 147 of track 140 causes the cross-talk signal reproduced with the signal recorded in line area 147 to be combined, with its phase or polarity reversed, with the delayed cross-talk signal reproduced with the signal recorded in line area 146, whereby the combined cross-talk signals cancel each other at the output of comb filter 112.

Although in the embodiments of the invention described above with reference to FIGS. 3 and 7 and FIGS. 11 and 12, it has been indicated that the comb filter 112 achieves suppression or elimination of cross-talk interference primarily by reason of the different frequency characteristics of the carriers with which the chrominance components signals are recorded in adjacent tracks, for example, the tracks 92 and 93 on FIG. 10, and although in the embodiment of the invention described above with reference to FIGS. 14 and 17 it has been indicated that the comb filter 112 achieves suppression or elimination of cross-talk interference primarily by reason of the different polarity characteristics of the carriers with which the chrominance components signals are recorded in adjacent tracks, for example, the tracks 139 and 140 on FIG. 15, it is to be understood that, in both types of apparatus according to this invention, the suppression or elimination of cross-talk or interference signals by comb filter 112 may result in differences in both the frequency and polarity characteristics of the carriers of the reproduced signals, either as actually reproduced or as supplied to the input of comb filter 112.

For example, in the case of the embodiment of FIGS. 3 and 7, in which the carriers of the chrominance component signals, as recorded in adjacent tracks, have different frequencies of $f_c - \frac{1}{4}(f_h)$ and $f_c + \frac{1}{4}(f_h)$, respectively, it has already been indicated that the desired signal supplied from the frequency converter 109 to the input of the comb filter 112 has the carrier frequency $f_s$ during each of the field intervals $T_a$ and $T_b$, while the cross-talk signal, as supplied to the input of comb filter 112, has a carrier frequency $f_s - \frac{1}{2}(f_h)$ during the field interval $T_a$ and a carrier frequency of $f_s + \frac{1}{2}(f_h)$ during the field interval $T_b$. Since $f_s$ is related to $f_h$ so that the phase or polarity of the carrier with the frequency $f_s$ will not change in successive line intervals, it will be apparent that the carriers supplied to the input of comb filter 112 with the frequency $f_s \pm \frac{1}{2}(f_h)$ will change polarity in successive line intervals. Accordingly, at the output of comb filter 112, the cross-talk signals with carrier frequencies of $f_s \pm \frac{1}{2}(f_h)$ will be combined with opposite polarities, and hence will cancel each other so as to eliminate the cross-talk signals from the signals passed to mixing circuit 107.

In the case of the embodiment of FIGS. 14 and 17, the frequency converted chrominance signals alternatively recorded in the line areas of FIG. 15 have carriers with the same frequencies, when considered instantaneously. However, this is not the case when the carrier of the frequency converted chrominance signals recorded in track 140, that is, during the field interval $T_b$ on FIG. 16, is considered as a whole. This may be explained by considering a simplified situation in which signals $C_a$ and $-C_a$, both of which have the carrier frequency $f_a$, are not modulated by chrominance components but are available at the two output terminals of the balanced modulator 133 as pure sine waves of opposite polarity. During the field interval $T_b$ when signals $C_a$ and $-C_a$ are selected alternately by the switching circuit 72, the output signal of the switching circuit is no longer a single signal but is a sine wave whose polarity reverses, or whose phase shifts 180°, at a repetition rate of $\frac{1}{2}(f_h)$. When a Fourier analysis is made of such a signal over a complete cycle of the interval of two horizontal lines, it will be found that the carrier frequency $f_a$ is no longer present, but has been replaced by first upper and lower side band spaced by $\frac{1}{2}(f_h)$ from the original carrier frequency and by additional upper and lower side band spaced from the first mentioned side bands and from each other, in order, by $f_h$. Therefore, in effect, the single-pole, double-throw switching circuit 72 operates as a balanced modulator, and the modulating signal is the switching signal that takes two horizontal line intervals for a complete cycle and therefore has a frequency of $\frac{1}{2}(f_h)$. Being, in effect, a balanced modulator, the switching circuit 72 produces a balanced output signal without a carrier. This balanced output signal, since it interleaves with the signal $C_a$ may be referred to as the signal $C_b$, and thus there is, in fact, an interleaving relationship between the carriers of the frequency converted carrier components of the signal recorded on the track 139 and that recorded on the track 140 in FIG. 15. Such interleaving relationship provides for an interleaving relationship between the previously referred to cross-talk or interference signals $C_{sb}$ and $-C_{sb}$ and the desired signals $C_s$ which further improves the cancellation of the cross-talk signals.

A possible modification of the apparatus according to this invention, as described above, involves the changes necessary to record a television signal produced according to the PAL system. As is known, the chrominance carrier in the PAL system is offset from one of the high harmonics of the line frequency $f_h$ by only $\frac{1}{4}(f_h)$ instead of $\frac{1}{2}(f_h)$, as in the NTSC system. Thus, in order to achieve an interleaving effect for recording signals of the PAL system, the difference between the carriers $f_{cb}$ and $f_{ca}$ (or $F_{cb}$ and $F_{ca}$) must follow the equation:

$$f_{cb} - f_{ca} = \frac{1}{4}(2k-1)f_h.$$

This is true for the recording apparatus disclosed in FIGS. 3 and 11 (and their corresponding playback apparatus in FIGS. 7 and 12). For the apparatus in FIGS. 14 and 17, the pulsing signal applied during the interval $T_b$ must have a repetition rate of $\frac{1}{4}(f_h)$. This corresponds to recording two line intervals in one polarity and the succeeding two line intervals in the opposite polarity, and is consistent with the fact that the carrier of one of the chrominance components in a PAL television signal is inverted in alternate line intervals.

All of the embodiments of the invention are also capable of being used with a mechanical recording system in which one field interval is broken up to be recorded on more than one track or in which an entire frame interval may be recorded on a single track.

Although several embodiments of the invention have been described in detail herein with reference to the accompanying drawings, it is to be understood that the invention is not limited to those precise embodiments, and that various changes and modifications, in addition to those specifically referred to above, may be effected by one skilled in the art without departing from the scope or spirit of the invention as defined in the appended claims.

What is claimed is:

1. In apparatus for recording periodic information signals comprised of first intervals and predetermined numbers of second intervals included in each of said first intervals and which are recorded in respective areas of successive parallel tracks on a record medium the combination of means for providing different first and second carriers for the information signals; carrier selecting means for alternatively selecting said first and second carriers for said information signals to be recorded in said tracks; and control means for said carrier selecting means operative to cause the recording of said information signals with said first and second carriers, respectively, in tracks which are next adjacent each other.

2. An apparatus according to claim 1; in which said first and second carriers have different frequencies which are in frequency-interleaving relationship to each other.

3. An apparatus according to claim 2; in which said information signals have an original carrier frequency which is in frequency-interleaving relationship to the frequency of said second intervals, and said different frequencies of said first and second carriers are also in frequency-interleaving relationships to said original carrier frequency and to said frequency of the second intervals.

4. An apparatus according to claim 2; in which said information signals have an original carrier frequency, said means for providing said first and second carriers of different frequencies includes frequency converting means receiving said information signals with said original carrier frequency, and means for producing first and second frequency converting signals selectively supplied to said frequency converting means for causing the latter to convert the carrier of said information signals from said original frequency to said frequencies of said first and second carriers, respectively, and said carrier selecting means determines which of said first and second frequency converting signals is supplied to said frequency converting means.

5. An apparatus according to claim 1; in which said first and second carriers have different polarity characteristics.

6. An apparatus according to claim 5; further comprising means for recording on the record medium control signals which are in predetermined positional relation to said tracks and which identify the tracks having information signals recorded therein with said first and second carriers, respectively.

7. An apparatus according to claim 5; in which the polarity of said first carrier is constant during successive second intervals of said information signals being recorded in one of said next adjacent tracks, and the polarity of said second carrier is reversed for successive second intervals of said information signals being recorded in another of said next adjacent tracks.

8. An apparatus according to claim 7; further comprising means for recording on the record medium control signals which are in predetermined positional relation to said tracks and which identify the tracks having information signals recorded therein with said first and second carriers, respectively.

9. An apparatus according to claim 7; in which said means for providing said first and second carriers includes balanced modulator means receiving said information signals and having first and second outputs of reversed polarity, said carrier selecting means includes switching means for alternatively passing said first and second outputs from said balanced modulator means, and said control means actuates said switching means so that the latter continuously passes said first output during recording in said one of the next adjacent tracks and passes said first and second outputs, alternately, during said successive second intervals of recording in said other of the next adjacent tracks.

10. An apparatus according to claim 1; in which the ends of the margins between successive areas in which said second intervals are recorded in each of said tracks are aligned, in the direction transverse to the lengths of the tracks, with the adjacent ends of the margins between the successive areas in which said second intervals are recorded in the next adjacent tracks.

11. An apparatus according to claim 1; further comprising means for recording on the record medium control signals which are in predetermined positional relation to said tracks and which identify the tracks having information signals recorded therein with said first and second carriers, respectively.

12. An apparatus according to claim 1; in which said successive parallel tracks are arranged without guard bands therebetween.

13. In apparatus for recording and reproducing periodic information signals comprised of first intervals and predetermined numbers of second intervals included in each of said first intervals and which are recorded in respective areas of successive parallel tracks on a record medium the combination of recording circuit means comprising means for providing different first and second carriers for the information signals, carrier selecting means for alternatively selecting said first and second carriers for said information signals to be recorded in said record tracks, and control means for said carrier selecting means operative to cause the recording of said information signals with said first and second carriers, respectively, in tracks which are next adjacent each other; and reproducing circuit means comprising transducer means for reproducing information signals recorded in each of said tracks along with cross-talk signals from tracks next adjacent thereto, and means for providing said information signals reproduced from each of said tracks with a common carrier and for eliminating said cross-talk signals there-from on the basis of said different first and second carriers with which the information signals are recorded in the tracks which are next adjacent each other.

14. The apparatus according to claim 13; in which said means for eliminating the cross-talk signals includes comb filter means.

15. An apparatus according to claim 14, in which the information signals to be recorded have an original carrier frequency which is in frequency-interleaving relationship to the frequency of said second intervals, said first and second carriers have different frequencies which are in frequency-interleaving relation to each other and to said original carrier frequency and to said frequency of the second intervals, and said different frequencies of the first and second carriers of the reproduced information signals are reconverted to said common carrier having a frequency which is the same as said original carrier frequency while said cross-talk signals are reconverted to have carrier frequencies at nodes of the frequency characteristic of said comb filter means so as to be eliminated by the latter.

16. An apparatus according to claim 13; in which said first and second carriers have different polarity characteristics with the polarity of said first carrier being constant and the polarity of said second carrier being reversed for successive second intervals of the information signals recorded with said second carrier; and in which said means for providing the reproduced information signals with a common carrier and for eliminating the cross-talk signals includes processing means for the reproduced originals having a first output at which processed signals are derived with the polarities of their carriers as recorded and a second output at which the processed signals are inverted, comb filter means having a delay equal to the duration of each of said second intervals, and switching means for continuously connecting said first output of said processing means to said comb filter means during the reproducing of information signals recorded with said first carrier and for alternately connecting said first and second outputs of said processing means to said comb filter means for successive second intervals of the information signals during the reproducing of the latter recorded with said second carrier.

17. An apparatus according to claim 13; in which the ends of the margins between successive areas in which said second intervals are recorded in each of said tracks are aligned, in the direction transverse to the lengths of the tracks, with the adjacent ends of the margins between the successive areas in which said second intervals are recorded in the next adjacent tracks.

18. An apparatus according to claim 13; in which said recording circuit means further comprises means for recording on the record medium control signals which are in predetermined positional relation to said tracks and which identify the tracks having information signals recorded therein with said first and second carriers, respectively; and in which said reproducing circuit means further comprises means for reproducing said control signals so as to identify the carrier of the information signals being reproduced by said transducer means, and said means for providing the reproduced information signals with said common carrier is controlled on the basis of said identifying control signals.

19. An apparatus according to claim 13; in which said successive parallel tracks are arranged without guard bands therebetween.

20. In an apparatus for reproducing periodic information signals comprised of first intervals and predetermined numbers of second intervals included in each of said first intervals and which are recorded in respective areas of successive parallel tracks on a record medium with the information signals recorded in next adjacent tracks having different first and second carriers: the combination of transducer means for scanning along said tracks one at a time so as to reproduce the information signals recorded in each of said tracks along with cross-talk signals from the tracks next adjacent thereto, and means for providing said information signals reproduced from each of said tracks with a common carrier and for eliminating said cross-talk signals therefrom on the basis of said different first and second carriers with which the information signals are recorded in the tracks which are next adjacent to each other.

21. An apparatus according to claim 20; in which said first and second carriers of the recorded information signals are in frequency-interleaving relation to each other and to the frequency of said second intervals; and in which said means for providing the reproduced information signals with a common carrier and for eliminating said cross-talk signals includes comb filter means having a frequency characteristic to pass signals in the frequency spectrum of said common carrier, and frequency converting means receiving the reproduced information and cross-talk signals and being operative to convert said first and second carrier frequencies to said frequency of the common carrier for passage through said comb filter means while converting said cross-talk signals to frequencies at nodes of said frequency characteristic of the comb filter means so as to be eliminated by the latter.

22. An apparatus according to claim 20; in which said first and second carriers of the recorded information signals have different polarity characteristics with the polarity of said first carrier being constant and the polarity of said second carrier being reversed for successive second intervals of the information signals recorded with said second carrier; and in which said means for providing the reproduced information signals with a common carrier and for eliminating the cross-talk signals includes processing means for the reproduced signals having a first output condition in which the processed signals are derived with the polarities of their respective carriers as recorded and a second output condition in which the processed signals are inverted, comb filter means with a delay-period equal to each of said second intervals and receiving said processed signals, and switching means for continuously establishing said first output condition of the processing means during the reproducing of information signals recorded with said first carrier and for alternately establishing said first and second output conditions of the processing means for successive second intervals of the information signals during the reproducing of the latter recorded with said second carrier.

23. An apparatus according to claim 20; in which the ends of the margins between successive area in which said second intervals are recorded in each of said tracks are aligned, in the direction transverse to the lengths of the tracks, with the adjacent ends of the margins between the successive areas in which said second intervals are recorded in the next adjacent tracks.

24. An apparatus according to claim 20; in which control signals are also recorded on the record medium in predetermined positional relation to said tracks so as to identify the tracks having information signals recorded therein with said first and second carriers, respectively; and further comprising means for reproducing said control signals and for controlling said means by which the reproduced information signals are provided with a common carrier on the basis of the reproduced identifying control signals.

25. In apparatus for recording video signals having luminance and chrominance signal components and being comprised of field intervals and line intervals which are recorded in respective areas of successive parallel tracks on a record medium: the combination of means for providing different first and second carriers for said chrominance signals components; carrier selecting means for alternatively selecting said first and second carriers for said chrominance signal components to be recorded in said tracks; and control means for said carrier selecting means operative to cause the recording of said chrominance signal components with said first and second carriers, respectively, in tracks which are next adjacent each other.

26. An apparatus according to claim 25; in which the ends of the margins between the areas in which the line intervals are recorded in each of said tracks are aligned, in the direction transverse to the lengths of the tracks, with the adjacent ends of the margins between the areas in which the line intervals are recorded in the next adjacent tracks.

27. An apparatus according to claim 25; further comprising means for recording on the record medium control signals in predetermined positional relation to said tracks and which identify the tracks having chrominance signals components recorded therein with said first and second carriers, respectively.

28. An apparatus according to claim 25; in which said record tracks are arranged on the record medium without guard bands therebetween.

29. An apparatus according to claim 25; further comprising means for frequency modulating said luminance signal component on a carrier prior to the recording of said video signals on the record medium; and in which said first and second carriers for the chrominance signal components have frequencies below the band of frequencies of the frequency modulated luminance signal component.

30. An apparatus according to claim 29; in which said record medium is magnetic, first and second magnetic transducers are provided for recording the video signals in said next adjacent tracks, respectively, and said first and second transducers have gaps with substantially different azimuth angles.

31. An apparatus according to claim 25; in which said chrominance signal components have an original carrier frequency which is in frequency-interleaving relation to the frequency of said line intervals, and said first and second carriers have different frequencies which are in frequency-interleaving relation to each other and to said original carrier frequency and said line interval frequency.

32. An apparatus according to claim 31; in which said means for providing said first and second carriers of different frequencies includes frequency converting means receiving said information signals with said original carrier frequency, and means for producing first and second frequency converting signals selectively supplied to said frequency converting means for causing the latter to convert the carrier of said information signals from said original frequency to said frequencies of said first and second carriers, respectively, and said carrier selecting means determines which of said first and second frequency converting signals is supplied to said frequency converting means.

33. An apparatus according to claim 32; in which said means for producing said first and second frequency converting signals includes first and second oscillators the outputs of which are selectively employed by said carrier selecting means.

34. An apparatus according to claim 32; in which said means for producing said first and second frequency converting signals includes an oscillator having an ouput for determining said first frequency converting signal, and frequency-dividing and multiplying means for dividing the output frequency of said oscillator by a non-integral number; and in which said carrier selecting means alternately select said output of the oscillator and the output of said frequency-multiplying and dividing means.

35. An apparatus according to claim 31; in which said first and second carriers have the frequencies $f_c - \frac{1}{4}f_h$ and $f_c + \frac{1}{4}f_h$, respectively, in which $f_h$ is the line interval frequency, and $f_c$ is $nf_h$ where $n$ is a whole integer.

36. An apparatus according to claim 25; in which said video signals are NTSC color video signals, and said first and second carriers have frequencies that differ from each other by $\frac{1}{2}(2k-1)f_h$, where $k$ is a whole integer and $f_h$ is the line interval frequency.

37. An apparatus according to claim 25; in which said video signals are PAL color video signals, and said first and second carriers have frequencies that differ from each other by $\frac{1}{4}(2k-1)f_h$, where $k$ is a whole integer and $f_h$ is the line interval frequency.

38. An apparatus according to claim 25, in which said video signals are NTSC color video signals, the polarity of said first carrier is constant during successive line intervals of the video signals being recorded in one of said next adjacent tracks, and the polarity of said second carrier is reversed for successive line intervals of the video signals being recorded in the other of said next adjacent tracks.

39. An apparatus according to claim 38; in which said means for providing said first and second carriers includes balanced modulator means receiving said chrominance signal components and having first and second outputs of reversed polarity, said carrier selecting means includes switching means for alternatively passing said first and second outputs from said balanced modulator means for recording on said record medium, and said control means actuates said switching means so that the latter continuously passes said first output during recording of the video signals in said one of the next adjacent tracks and passes said first and second outputs alternately, during successive line intervals of recording in said other of the next adjacent tracks.

40. An apparatus according to claim 39; in which said means for providing the first and second carriers further includes means for separating horizontal synchronizing signals and vertical synchronizing signals from the video signals being recorded, and said control means is operated by the separated horizontal and vertical synchronizing signals.

41. An apparatus according to claim 25; in which said video signals are PAL color video signals, the polarity of said first carrier is constant during successive line intervals of the video signals being recorded in one of said next adjacent tracks, and the polarity of said second carrier is reversed after each two line intervals of the video signals being recorded in the other of said next adjacent tracks.

42. An apparatus according to claim 25; in which said record medium is magnetic, first and second magnetic transducers are provided for recording the video signals in said next adjacent tracks, respectively, and said first and second transducers have gaps with substantially different azimuth angles.

43. In apparatus for recording and reproducing video signals having luminance and chrominance signal components and being comprised of field intervals and line intervals which are recorded in respective areas of successive parallel record tracks on a record medium: the combination of recording circuit means comprising means for providing different first and second carriers for the chrominance signal components, carrier selecting means for alternatively selecting said first and second carriers for said chrominance signal components to be recorded in said record tracks, and control means for said carrier selecting means operative to cause the recording of said chrominance signal components with said first and second carriers, respectively, in tracks which are next adjacent each other; and reproducing circuit means comprising reproducing transducer means for reproducing video signals recorded in each of said tracks along with cross-talk signals from tracks next adjacent thereto, means for separating said chrominance signal components from the luminance signal component in the reproduced signals, and means for providing the separated chrominance signal components of video signals reproduced from each of said tracks with a common carrier and for eliminating therefrom the chrominance signal components of the crosstalk signals on the basis of said different first and second carriers with which the chrominance signal components are recorded in the tracks which are next adjacent to each other.

44. An apparatus according to claim 43; in which the ends of the margins between the areas in which the line intervals are recorded in each of said tracks are aligned, in the direction transverse to the lengths of the tracks, with the adjacent ends of the margins between the areas in which the line intervals are recorded in the next adjacent tracks.

45. An apparatus according to claim 43; in which said record medium is magnetic, first and second magnetic recording transducers are provided for recording the video signals in said next adjacent tracks, respectively, said reproducing transducer means includes first and second magnetic reproducing transducers for reproducing the signals recorded by said first and second recording transducers, respectively, and said first recording and reproducing transducers have gaps with azimuth angles that are substantially adifferent from the azimuth angles of the gaps of said second recording and reproducing transducers so as to suppress the luminance signal components of said crosstalk signals.

46. An apparatus according to claim 43, in which said recording circuit means further comprises means for frequency modulating said luminance signal component on a carrier prior to the recording of said video signals on the record medium; and in which said first and second carriers for the chrominance signal components have frequencies below the band of frequencies of said luminance signal component.

47. An apparatus according to claim 43; in which the chrominance signal components have an original carrier frequency which is in frequency-interleaving relation to the frequency of said line intervals, said first and second carriers have different frequencies which are in frequency-interleaving relation to each other and to said original carrier frequency and said line intervals frequency, said means for eliminating the chrominance signal components of the cross-talk signals includes comb filter means having a predetermined frequency transmission characteristic for passing the energy spectrum of said original carrier frequency, and said means for providing the separated chrominance signal components of the reproduced video signals with a common carrier is operative to reconvert the different frequencies of said first and second carriers to said original carrier frequency while said chrominance signal components of the cross-talk signals are reconverted to frequencies at nodes of said frequency transmission characteristic of said comb filter means so as to be blocked by the latter.

48. An apparatus according to claim 43; in which said first and second carriers have different polarity characteristics with the polarity of said first carrier being constant and the polarity of said second carrier being reversed after every predetermined number of line intervals of the video signals recorded with said second carrier; and in which said means for providing the separated chrominance signal components with a common carrier and for eliminating therefrom the chrominance signal components of the cross-talk signals includes processing means for the chrominance signal components of the reproduced signals having a first output condition in which processed signals are derived with the polarities of their carriers as recorded and a second output condition in which the processed signals are inverted, comb filter means having a delay period equal to one of said line intervals and receiving said processed signals, and switching means for continuously establishing said first output condition of the processing means during the reproducing of video signals having the chrominance signal components recorded with said first carrier and for alternately establishing said first and second output conditions of the processing means after said predetermined number of line intervals during the reproducing of video signals having the chrominance signal components thereof recorded with said second carrier.

49. An apparatus according to claim 48; in which said predetermined number is 1 when said video signals are NTSC color video signals and said predetermined number is 2 when said video signals are PAL color video signals.

50. In an apparatus for reproducing video signals having luminance and chrominance signal components and comprised of field intervals and line intervals which are recorded in respective areas of successive parallel tracks on a record medium with said chrominance signal components of video signals recorded in next adjacent tracks having different first and second carriers: the combination of transducer means for scanning along said tracks one at a time so as to reproduce the video signals recorded in each of said tracks along with cross-talk signals from the tracks next adjacent thereto, means for separating said chrominance signal components from the luminance signal component in the reproduced signals, and means for providing the separated chrominance signal components of video signals reproduced from each of said tracks with a common carrier and for eliminating therefrom the chrominance signal components of the cross-talk signals on the basis of said different first and second carriers with which the chrominance signal components are recorded in the tracks which are next adjacent to each other.

51. An apparatus according to claim 50; in which the ends of the margins between the areas in which the line intervals are recorded in each of said tracks are aligned, in the direction transverse to the lengths of the tracks, with the adjacent ends of the margins between the areas in which the line intervals are recorded in the next adjacent tracks.

52. An apparatus according to claim 50; in which said record medium is magnetic, said next adjacent tracks have the video signals magnetically recorded therein with different azimuths, said transducer means includes first and second reproducing magnetic transducers having gaps with different azimuths corresponding to said azimuths of the next adjacent tracks and respectively reproducing video signals recorded in the latter so as to suppress the luminance signal components of the cross-talk signals.

53. An apparatus according to claim 52; in which said first and second carriers are in frequency-interleaving relation to each other and to the line interval frequency; and in which said means for providing the separated chrominance signal components of the reproduced video signals with a common carrier and for eliminating therefrom said chrominance signal components of the cross-talk signals includes comb filter means having a frequency transmission characteristic to pass signals in the frequency spectrum of said common carrier, and frequency converting means receiving said separated chrominance signal components of the reproduced video signals and cross-talk signals and being operative to convert said first and second carriers to said common carrier frequency for passage through said comb filter means while converting the chrominance signal components of said cross-talk signals to carrier frequencies at nodes of said frequency transmission characteristic of the comb filter means so as to be blocked by the latter.

54. An apparatus according to claim 52; in which said first and second carriers of said chrominance signal components of the recorded video signals have different polarity characteristics with the polarity of said first carrier being constant and the polarity of said second carrier being reversed for successive line intervals of the chrominance signal components recorded with said second carrier; and in which said means for providing the chrominance signal components of the reproduced video signals with a common carrier and for eliminating the chrominance signal components of the cross-talk signals includes processing means for chrominance signal components of the reproduced video signals and cross-talk signals having a first output at which processed signals are derived with the polarities of their respective carriers as recorded and a second output at which the processed signals are inverted, comb filter means with a delay period equal to one of said line intervals, and switching means for continuously connecting said first output of the processing means to said comb filter means during the reproduction of video signals recorded with the chrominance signal components on said first carrier and for alternately connecting said first and second outputs of said processing means to said comb filter means for successive line intervals of the video signals during the reproducing of the video signals recorded with the chrominance signal components on said second carrier.

55. An apparatus according to claim 54; in which said means for providing the chrominance signal components of the reproduced video signals with a common carrier and for eliminating the chrominance signal components of the crosstalk signals further includes means for separating horizontal synchronizing signals and vertical synchronizing signals from the reproduced video signals, and control means operated by the separated horizontal and vertical synchronizing signals for actuating said switching means.

* * * * *